US012455826B2

(12) United States Patent
Werner et al.

(10) Patent No.: US 12,455,826 B2
(45) Date of Patent: Oct. 28, 2025

(54) DYNAMIC CACHING POLICIES FOR PROCESSING-IN-MEMORY

(71) Applicant: Advanced Micro Devices, Inc., Santa Clara, CA (US)

(72) Inventors: David Andrew Werner, Austin, TX (US); Stuart David Simpson-Biles, Suffolk (GB); Travis Henry Boraten, Austin, TX (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 18/621,319

(22) Filed: Mar. 29, 2024

(65) Prior Publication Data

US 2025/0307147 A1   Oct. 2, 2025

(51) Int. Cl.
*G06F 12/0815* (2016.01)
(52) U.S. Cl.
CPC .................. *G06F 12/0815* (2013.01)
(58) Field of Classification Search
None
See application file for complete search history.

(56) References Cited

U.S. PATENT DOCUMENTS

| | | |
|---|---|---|
| 6,553,465 B1 | 4/2003 | Takusagawa |
| 6,944,746 B2 | 9/2005 | So |
| 7,047,393 B2 | 5/2006 | Paver |
| 8,359,462 B1 | 1/2013 | Khan et al. |
| 9,575,815 B1 | 2/2017 | Guthrie et al. |
| 10,061,588 B2 | 8/2018 | Gschwind et al. |
| 11,119,923 B2 * | 9/2021 | Farmahini Farahani ................... G06F 12/0813 |
| 11,487,447 B2 | 11/2022 | Islam et al. |
| 11,594,274 B2 | 2/2023 | Murphy et al. |
| 11,625,249 B2 | 4/2023 | Kotra et al. |

(Continued)

FOREIGN PATENT DOCUMENTS

WO   WO-2022046371   3/2022

OTHER PUBLICATIONS

U.S. Appl. No. 18/298,723 , "Non-Final Office Action", U.S. Appl. No. 18/298,723, Jun. 20, 2024, 9 pages.

(Continued)

*Primary Examiner* — Edward J Dudek, Jr.
*Assistant Examiner* — Ralph A Verderamo, III
(74) *Attorney, Agent, or Firm* — FIG. 1 Patents

(57) ABSTRACT

A computing device includes a memory having one or more processing-in-memory units, and a host processor that includes one or more caches. The host processor receives a workload that accesses a page of the memory. Further, the host processor dynamically assigns different modes of operation to the page of the memory during different phases of execution of the workload. The different modes are assigned based on whether the workload is to be executed by the host processor, the one or more processing-in-memory units, or the host processor and the one or more processing-in-memory units during the different phases of execution. The host processor processes requests of the workload that access the page of the memory in accordance with the different modes of operation during the different phases of execution. Notably, the different modes of operation specify different caching policies for the page of the memory.

20 Claims, 6 Drawing Sheets

(56) References Cited

U.S. PATENT DOCUMENTS

| | | | |
|---|---|---|---|
| 11,625,251 | B1 | 4/2023 | Agrawal et al. |
| 11,663,008 | B2 | 5/2023 | Lee et al. |
| 11,797,201 | B2 | 10/2023 | Islam et al. |
| 11,868,777 | B2 | 1/2024 | Kalamatianos et al. |
| 12,073,251 | B2 | 8/2024 | Challapalle et al. |
| 12,153,926 | B2 | 11/2024 | Kalamatianos et al. |
| 12,265,470 | B1 | 4/2025 | Boraten et al. |
| 2008/0046692 | A1 | 2/2008 | Michalak et al. |
| 2008/0244185 | A1 | 10/2008 | O'Krafka et al. |
| 2011/0242113 | A1 | 10/2011 | Keall et al. |
| 2012/0069664 | A1 | 3/2012 | Kim et al. |
| 2012/0246395 | A1 | 9/2012 | Cho et al. |
| 2013/0086367 | A1 | 4/2013 | Gschwind et al. |
| 2014/0281405 | A1 | 9/2014 | Streett et al. |
| 2016/0092238 | A1 | 3/2016 | Codrescu et al. |
| 2016/0155491 | A1 | 6/2016 | Roberts et al. |
| 2017/0060588 | A1 | 3/2017 | Choi |
| 2017/0123987 | A1 | 5/2017 | Cheng et al. |
| 2017/0213312 | A1 | 7/2017 | Woo et al. |
| 2017/0262369 | A1 | 9/2017 | Murphy |
| 2017/0344479 | A1* | 11/2017 | Boyer ................. G06F 12/0817 |
| 2017/0344480 | A1 | 11/2017 | Beard et al. |
| 2018/0074958 | A1* | 3/2018 | Jayasena ............. G06F 12/0811 |
| 2018/0089081 | A1 | 3/2018 | Ramalingam |
| 2018/0188961 | A1 | 7/2018 | Venkatesh et al. |
| 2018/0336035 | A1 | 11/2018 | Choi et al. |
| 2019/0089081 | A1 | 3/2019 | Zhang |
| 2020/0192757 | A1 | 6/2020 | Qin et al. |
| 2020/0218540 | A1 | 7/2020 | Kesiraju et al. |
| 2021/0271680 | A1 | 9/2021 | Lee et al. |
| 2022/0076717 | A1 | 3/2022 | Mathew et al. |
| 2022/0188117 | A1 | 6/2022 | Kalamatianos et al. |
| 2022/0188233 | A1 | 6/2022 | Kalamatianos et al. |
| 2022/0197814 | A1* | 6/2022 | Yudanov ............. G06F 12/0895 |
| 2022/0206817 | A1 | 6/2022 | Kotra et al. |
| 2022/0206855 | A1 | 6/2022 | Challapalle et al. |
| 2022/0276795 | A1 | 9/2022 | Islam et al. |
| 2023/0244442 | A1 | 8/2023 | Lee et al. |
| 2023/0244492 | A1 | 8/2023 | Kotra et al. |
| 2024/0126552 | A1 | 4/2024 | Kalamatianos et al. |
| 2025/0110878 | A1 | 4/2025 | Boraten et al. |
| 2025/0110887 | A1 | 4/2025 | Werner et al. |

OTHER PUBLICATIONS

U.S. Appl. No. 18/393,657, "Notice of Allowance", U.S. Appl. No. 18/393,657, Jul. 31, 2024, 9 pages.

"Corrected Notice of Allowability", U.S. Appl. No. 18/374,969, Jan. 15, 2025, 2 pages.

U.S. Appl. No. 17/473,242, "Final Office Action", U.S. Appl. No. 17/473,242, Oct. 22, 2024, 13 pages.

U.S. Appl. No. 18/298,723, "Final Office Action", U.S. Appl. No. 18/298,723, Oct. 11, 2024, 7 pages.

U.S. Appl. No. 18/374,969, "Notice of Allowance", U.S. Appl. No. 18/374,969, Jan. 2, 2025, 10 pages.

U.S. Appl. No. 18/375,018, "Non-Final Office Action", U.S. Appl. No. 18/375,018, Oct. 9, 2024, 11 pages.

"HPCA 2021", The 27th IEEE International Symposium on High-Performance Computer Architecture (HPCA-27), Seoul, South Korea [retrieved Sep. 15, 2022]. Retrieved from the Internet <https://hpca-conf.org/2021/keynotes/>., Mar. 2021, 3 Pages.

U.S. Appl. No. 17/123,270, , "Final Office Action", U.S. Appl. No. 17/123,270, Nov. 23, 2021, 15 pages.

U.S. Appl. No. 17/123,270, , "Non-Final Office Action", U.S. Appl. No. 17/123,270, Aug. 4, 2021, 14 pages.

U.S. Appl. No. 17/123,270, , "Notice of Allowance", U.S. Appl. No. 17/123,270, Sep. 7, 2023, 7 pages.

U.S. Appl. No. 17/123,270, , "Notice of Allowance", U.S. Appl. No. 17/123,270, Nov. 10, 2022, 7 pages.

U.S. Appl. No. 17/136,767, , "Non-Final Office Action", U.S. Appl. No. 17/136,767, Dec. 20, 2023, 20 pages.

U.S. Appl. No. 17/136,767, , "Notice of Allowance", U.S. Appl. No. 17/136,767, Apr. 30, 2024, 18 pages.

U.S. Appl. No. 17/137,140, , "Final Office Action", U.S. Appl. No. 17/137,140, Aug. 15, 2022, 8 pages.

U.S. Appl. No. 17/137,140, , "Non-Final Office Action", U.S. Appl. No. 17/137,140, Mar. 9, 2022, 8 pages.

U.S. Appl. No. 17/137,140, , "Notice of Allowance", U.S. Appl. No. 17/137,140, Dec. 8, 2022, 8 pages.

U.S. Appl. No. 17/473,242, , "Non-Final Office Action", U.S. Appl. No. 17/473,242, Mar. 7, 2024, 16 pages.

U.S. Appl. No. 17/745,278, , "Non-Final Office Action", U.S. Appl. No. 17/745,278, Feb. 23, 2023, 8 pages.

U.S. Appl. No. 17/745,278, , "Notice of Allowance", U.S. Appl. No. 17/745,278, Jun. 14, 2023, 5 pages.

Adhinarayanan, Vignesh et al., "Pursuant to MPEP § 2001.06(b) the applicant brings the following co-pending application to the Examiner's attention:", U.S. Appl. No. 17/855,157, filed Jun. 30, 2022, 37 pages.

Agrawal, Varun et al., "Pursuant to MPEP § 2001.06(b) the applicant brings the following co-pending application to the Examiner's attention:", U.S. Appl. No. 17/561,112, filed Dec. 23, 2021, 25 pages.

Ahn, Junwhan et al., "PIM-enabled instructions: a low-overhead, locality-aware processing-in-memory architecture", ACM SIGARCH Computer Architecture News, vol. 43, No. 3S [retrieved Jan. 12, 2024]. Retrieved from the Internet <https://doi.org/10.1145/2872887.2750385>, Jun. 13, 2015, 13 pages.

Alsop, Jonathan et al., "Pursuant to MPEP § 2001.06(b) the applicant brings the following co-pending application to the Examiner's attention:", U.S. Appl. No. 17/853,613, filed Jun. 29, 2022, 28 pages.

Aweke, Zelalem B. et al., "ANVIL: Software-Based Protection Against Next-Generation Rowhammer Attacks", ACM SIGPLAN Notices, vol. 51, No. 4 [retrieved Sep. 15, 2022]. Retrieved from the Internet <http://www.seclab.cs.stonybrook.edu/seclab/pubs/ANVIL.pdf>., Mar. 25, 2016, 13 Pages.

Boraten, Travis H. et al., "Pursuant to MPEP § 2001.06(b) the applicant brings the following co-pending application to the Examiner's attention:", U.S. Appl. No. 18/192,925, filed Mar. 30, 2023, 48 pages.

Boraten, Travis H. et al., "Pursuant to MPEP § 2001.06(b) the applicant brings the following co-pending application to the Examiner's attention:", U.S. Appl. No. 18/374,951, filed Sep. 29, 2023, 50 pages.

Boraten, Travis H et al., "Pursuant to MPEP § 2001.06(b) the applicant brings the following co-pending application to the Examiner's attention:", U.S. Appl. No. 18/374,969, filed Sep. 29, 2023, 51 pages.

Boraten, Travis H. , "Pursuant to MPEP § 2001.06(b) the applicant brings the following co-pending application to the Examiner's attention:", U.S. Appl. No. 18/146,904, filed Dec. 27, 2022, 53 pages.

Boyer, Michael W. et al., "Pursuant to MPEP § 2001.06(b) the applicant brings the following co-pending application to the Examiner's attention:", U.S. Appl. No. 17/719,225, filed Apr. 12, 2022, 32 pages.

Brasser, Ferdinand et al., "CAn't touch this: software-only mitigation against rowhammer attacks targeting kernel memory", Proceedings of the 26th USENIX Conference on Security Symposium [retrieved Sep. 15, 2022]. Retrieved from the Internet <https://www.usenix.org/system/files/conference/usenixsecurity17/sec17-brasser.pdf>., Aug. 16, 2017, 15 Pages.

Byoung-Hak, Kim et al., "Exploration of a PIM Design Configuration for Energy-Efficient Task Offloading", 2019 IEEE International Symposium on Circuits and Systems (ISCAS) [retrieved Jan. 12, 2024]. Retrieved from the Internet <https://doi.org/10.1109/ISCAS.2019.8702339>, May 2019, 4 pages.

Cantin, J.F. et al., "Coarse-Grain Coherence Tracking: RegionScout and Region Coherence Arrays", IEEE Micro, vol. 26, No. 1 [retrieved Oct. 16, 2022]. Retrieved from the Internet <https://pharm.ece.wisc.edu/papers/ieeemicro2005.pdf>., Oct. 11, 2022, 10 Pages.

Ghose, S et al., "Processing-in-memory: A workload-driven perspective", IBM Journal of Research and Development, vol. 63, No.

(56) References Cited

OTHER PUBLICATIONS

6 [retrieved Jan. 12, 2024]. Retrieved from the Internet <https://doi.org/10.1147/JRD.2019.2934048> 1 of 2, Aug. 8, 2019, 19 pages.
Ghose, S et al., "Processing-in-memory: A workload-driven perspective", IBM Journal of Research and Development, vol. 63, No. 6 [retrieved Jan. 12, 2024]. Retrieved from the Internet <https://doi.org/10.1147/JRD.2019.2934048> 2 of 2, Aug. 8, 2019, 19 pages.
Gulur, Nagendra Dwarakanath et al., "Multiple sub-row buffers in DRAM: unlocking performance and energy improvement opportunities", Proceedings of the 26th ACM international conference on Supercomputing [retrieved Sep. 15, 2022]. Retrieved from the Internet <https://csrl.cse.unt.edu/sites/default/files/publications/p257-gulur.pdf>., Jun. 25, 2012, 10 Pages.
Hassan, Hasan et al., "Uncovering In-DRAM RowHammer Protection Mechanisms: A New Methodology, Custom RowHammer Patterns, and Implications", 54th Annual IEEE/ACM International Symposium on Microarchitecture [retrieved Sep. 15, 2022]. Retrieved from the Internet <https://arxiv.org/pdf/2110.10603.pdf>., Oct. 17, 2021, 16 Pages.
Jin, Xingyu et al., "Project Zero", News and updates from the Project Zero team at Google [retrieved Sep. 15, 2022]. Retrieved from the Internet <https://googleprojectzero.blogspot.com/>., Aug. 10, 2022, 15 Pages.
Kim, Jeremie S. et al., "Revisiting RowHammer: An Experimental Analysis of Modern DRAM Devices and Mitigation Techniques", Cornell University arXiv, arXiv.org [retrieved Sep. 15, 2022]. Retrieved from the Internet <https://arxiv.org/pdf/2005.13121.pdf>., May 29, 2020, 15 Pages.
Kim, Nam Sung , "A Journey to a Commercial-Grade Processing-In-Memory (PIM) Chip Development", The 27th IEEE International Symposium on High-Performance Computer Architecture (HPCA-27), Seoul, South Korea [retrieved May 24, 2023]. Retrieved from the Internet <https://hpca-conf.org/2021/keynotes/>., Mar. 3, 2021, 3 Pages.
Kim, Yoongu et al., "A case for exploiting subarray-level parallelism (SALP) in DRAM", 2012 39th Annual International Symposium on Computer Architecture (ISCA) [retrieved Sep. 15, 2022]. Retrieved from the Internet <https://www.pdl.cmu.edu/PDL-FTP/NVM/ISCA39_SALP.pdf>., Sep. 2012, 14 Pages.
Kim, Yoongu et al., "Flipping bits in memory without accessing them: an experimental study of DRAM disturbance errors", ACM SIGARCH Computer Architecture News, vol. 42, No. 3 [retrieved Sep. 15, 2022]. Retrieved from the Internet <https://people.cs.pitt.edu/~znati/Courses/cs2001/2001pprs/row-hammering.pdf>., Jun. 14, 2014, 12 Pages.
Konoth, Radhesh Krishnan , "ZebRAM: Comprehensive and Compatible Software Protection Against Rowhammer Attacks", 13th USENIX Symposium on Operating Systems Design and Implementation [retrieved Sep. 15, 2022]. Retrieved from the Internet <https://www.usenix.net/system/files/osdi18-konoth.pdf>., Oct. 2018, 15 Pages.
Kotra, Jagadish B. et al., "Pursuant to MPEP § 2001.06(b) the applicant brings the following co-pending application to the Examiner's attention:", U.S. Appl. No. 18/146,509, filed Dec. 27, 2022, 48 pages.
Lamport, Leslie , "Sharing Memory Between Processes", Part II. Interprocess Communication [retrieved May 24, 2023]. Retrieved from the Internet <https://techpubs.jurassic.nl/manuals/0630/developer/T_IRIX_Prog/sgi_html/ch03.html#id5198232>., Jun. 1986, 19 Pages.
Lee, Eojin et al., "TWiCe: preventing row-hammering by exploiting time window counters", Proceedings of the 46th International Symposium on Computer Architecture [retrieved Sep. 15, 2022]. Retrieved from the Internet <https://cpb-us-w2.wpmucdn.com/sites.coecis.cornell.edu/dist/7/89/files/2019/06/isca19-334.pdf>., Jun. 22, 2019, 12 Pages.
Lee, Won Jun et al., "Design of Processing-"Inside"-Memory Optimized for DRAM Behaviors", IEEE Access, vol. 7 [retrieved Jan. 12, 2024]. Retrieved from the Internet <https://doi.org/10.1109/ACCESS.2019.2924240>, Jun. 21, 2019, 16 pages.
Nai, Lifeng et al., "GraphPIM: Enabling Instruction-Level PIM Offloading in Graph Computing Frameworks", 2017 IEEE International Symposium on High Performance Computer Architecture (HPCA), Feb. 2017, 12 pages.
Orosa, Lois et al., "A Deeper Look into RowHammer's Sensitivities: Experimental Analysis of Real DRAM Chips and Implications on Future Attacks and Defenses", Cornell University arXiv, arXiv.org [retrieved Sep. 15, 2022]. Retrieved from the Internet <https://arxiv.org/pdf/2110.10291.pdf>., Oct. 19, 2021, 17 Pages.
Pattnaik, Ashutosh et al., "Scheduling techniques for GPU architectures with processing-in-memory capabilities", PACT '16: Proceedings of the 2016 International Conference on Parallel Architectures and Compilation [retrieved Oct. 16, 2022]. Retrieved from the Internet <https://research.ece.cmu.edu/safari/pubs/scheduling-for-GPU-processing-in-memory_pact16.pdf>., Sep. 11, 2016, 14 Pages.
Qureshi, Moinuddin et al., "Hydra: enabling low-overhead mitigation of row-hammer at ultra-low thresholds via hybrid tracking", Proceedings of the 49th Annual International Symposium on Computer Architecture [retrieved Sep. 15, 2022]. Retrieved from the Internet <https://memlab.ece.gatech.edu/papers/ISCA_2022_1.pdf>., Jun. 11, 2022, 12 Pages.
Saileshwar, Gururaj , "Randomized row-swap: mitigating Row Hammer by breaking spatial correlation between aggressor and victim rows", Proceedings of the 27th ACM International Conference on Architectural Support for Programming Languages and Operating Systems [retrieved Sep. 15, 2022]. Retrieved from the Internet <https://gururaj-s.github.io/assets/pdf/ASPLOS22_Saileshwar.pdf>., Feb. 28, 2022, 14 Pages.
Werner, David A. et al., "Pursuant to MPEP § 2001.06(b) the applicant brings the following co-pending application to the Examiner's attention:", U.S. Appl. No. 18/375,018, filed Sep. 29, 2023, 54 pages.
Xu, Sheng et al., "TUPIM: A Transparent and Universal Processing-in-Memory Architecture for Unmodified Binaries", GLSVLSI '20: Proceedings of the 2020 on Great Lakes Symposium on VLSI, Sep. 2020, 6 pages.
Yağlikçl, Giray A. et al., "BlockHammer: Preventing RowHammer at Low Cost by Blacklisting Rapidly-Accessed DRAM Rows", Cornell University arXiv, arXiv.org [retrieved Sep. 15, 2022]. Retrieved from the Internet <https://arxiv.org/pdf/2102.05981.pdf>., Feb. 11, 2021, 15 Pages.
"ARM946E-S Technical Reference Manual r1p1", Arm Developer [retrieved May 17, 2023]. Retrieved from the Internet <https://developer.arm.com/documentation/ddi0201/d/programmer-s-model/cp15-register-map-summary/register-7--cache-operations-register>, 6 Pages.
"Google Project Zero", GitHub Inc., Uplaoded by Projects by Google Project Zero [retrieved Sep. 15, 2022]. Retrieved from the Internet <https://github.com/googleprojectzero>., 3 Pages.
"X86 Instruction Set Reference: CLFLUSH", Retrieved Jan. 24, 2024. Retrieved from the Internet <https://c9x.me/x86/html/file_module_x86_id_30.html>, 2 pages.
"Final Office Action", U.S. Appl. No. 18/375,018, filed Apr. 15, 2025, 13 pages.
Kim, Nam Sung, "A Journey to a Commercial-Grade Function-In-Memory (FIM) Chip Development", HPCA-2021, Keynote [retrieved May 10, 2023]. Retrieved from the Internet <https://hpca-conf.org/2021/keynotes/>., Mar. 3, 2021, 3 Pages.
Lee, et al., "DRAM Row hammer micro-benchmark", GitHub, Inc. Uploaded by rowhammer-test [retrieved Sep. 15, 2022]. Retrieved from the Internet <https://github.com/google/rowhammer-test>., 3 Pages.

\* cited by examiner

DYNAMIC CACHING POLICIES FOR PROCESSING-IN-MEMORY

BACKGROUND

Processing-in-memory (PIM) architectures move processing of memory-intensive computations to memory. This contrasts with standard computer architectures which communicate data back and forth between a memory and a remote processing unit. In terms of data communication pathways, remote processing units of conventional computer architectures are further away from memory than PIM units. As a result, these conventional computer architectures suffer from increased data transfer latency, which can decrease overall computer performance. Further, due to the proximity to memory, PIM architectures can also provision higher memory bandwidth and reduced memory access energy relative to conventional computer architectures particularly when the volume of data transferred between the memory and the remote processing unit is large. Thus, PIM architectures enable increased computer performance while reducing data transfer latency as compared to conventional computer architectures that implement remote processing hardware.

DETAILED DESCRIPTION

Overview

Figure 1:
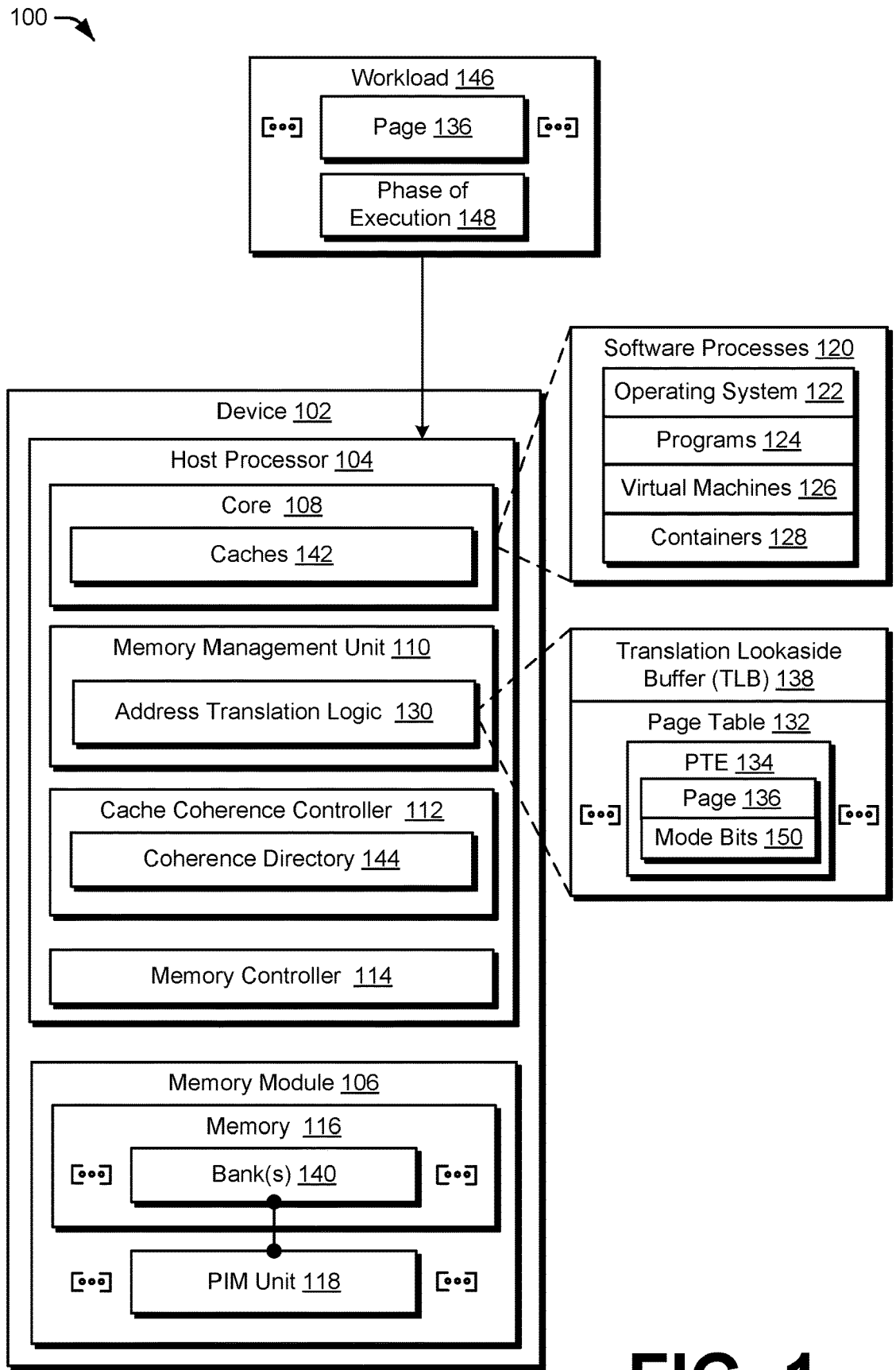
FIG. 1 is a block diagram of a non-limiting example system to implement dynamic caching policies for processing-in-memory.

A device includes a host processor communicatively coupled to a memory module having a memory and one or more processing-in-memory (PIM) units. The host processor includes a core, and the core includes one or more caches where data is stored. When the host processor executes a workload, it is desirable to store data accessed by the workload in the caches since the host processor accesses data in the caches faster than data in the memory. When the PIM units execute a workload, however, it is desirable for data accessed by the workload to be stored in the main memory. This is because in order to execute a PIM-load request of a PIM workload, a PIM unit reads data directly from main memory into registers of a PIM unit. Thus, in order to ensure functional correctness of PIM-load operations, the main memory is to contain coherent or clean copies of data that are accessed by the PIM-load operations.

In one or more implementations, the caches and the memory store different versions of corresponding data. For instance, the core modifies data of a cache line stored in the caches, and as such, the corresponding data of the cache line stored in the memory is stale. For this reason, the host processor includes a cache coherence controller employed to enforce coherence or uniformity of data between the caches and the memory. As part of this, the cache coherence controller implements a coherence protocol upon receiving an access request to access a memory address from memory, e.g., rather than the caches. The coherence protocol involves performing one or more lookups for the memory address in a coherence directory, forwarding the access request to be carried out in memory in response to a coherence directory miss, and flushing and/or invalidating the data of the memory address in the caches in response to a coherence directory hit.

A PIM unit, however, is often configured to operate on multiple banks of the memory in parallel. Since PIM-Load requests involve reading data from banks of the memory, PIM-Load requests are typically forwarded to the cache coherence controller which performs the aforementioned coherence protocol to ensure that the banks of the memory contain a clean (e.g., most recent) version of the requested data. However, since a PIM-Load request touches multiple banks, the PIM-Load request triggers multiple lookups, e.g., one lookup for each bank that a PIM unit operates on. The number of lookups triggered by PIM-Load requests is detrimental to performance because it increases contention for shared resources (e.g., communication bandwidth between the memory module and the host processor, and shared queues of the cache coherence controller), and increases latency of PIM-Load operations (e.g., because PIM-Load operations stall until flush and invalidate operations have completed in the caches).

Notably, different phases of workloads are processed by different processing resources, e.g., primarily by the host processor, primarily by the PIM units, or by both the host processor and the PIM units. As previously mentioned, it is desirable to store data accessed by a workload in the caches during execution phases in which the host processor accesses the workload, but it is desirable to store data accessed by a workload in the main memory during execution phases in which the PIM units execute the workload. Thus, the described techniques dynamically assign different modes of operation to pages of memory accessed by a workload during different execution phases, and the different modes of operation dictate different caching policies.

A cache's mode of operation is, in part, defined by a write policy and a write miss policy. Broadly, write policies dictate what happens when data is written to the caches, while write miss policies dictate what happens when a write request misses in the caches. Example write policies include write-back and write-through policies. Whenever data is written to the caches in a write-through policy, the data is also written to a corresponding location in the memory. Under the write-back policy, a cache line is written to memory when the cache line is evicted from the caches, e.g., and not whenever the cache line is modified by a write operation. Example write miss policies include write-allocate and no-write-allocate policies. When a write miss occurs in accordance with a write-allocate policy, the data is fetched from the memory into the caches, and the write operation is carried out in the caches. When a write miss occurs in accordance with a no-write allocate policy, the write operation is carried out in the memory, and the written data is not copied to the caches.

In accordance with the described techniques, the host processor receives a workload that accesses a page of memory, and the workload is indicated as having multiple phases of execution. During an example execution phase in which the host processor primarily executes the workload, the host processor assigns a host mode of operation to the page. While the host mode is assigned, the host processor processes write requests to the page in accordance with the write-back policy and the write-allocate policy. This combination of policies provides a higher likelihood that data operated on by the workload is present in the caches (e.g., increasing data access speed for the host processor), while reducing the number of write operations sent to the memory (e.g., reducing consumption of system communication bandwidth).

During an example execution phase in which the host processor and the PIM units execute the workload, the host processor assigns a hybrid mode to the page. While the hybrid mode is assigned, the host processor changes the caching policies to the write-through policy and the write-allocate policy. Under this combination of policies, the latest version of data is written to both the caches and the memory regardless of whether a write request hits or misses in the caches. Thus, this combination of policies provides a higher likelihood that data operated on by the workload is present in the caches (e.g., increasing data access speed for the host processor). In addition, this combination of policies reduces the likelihood that incoherent or dirty data is present in the caches, thereby avoiding critical path flush and invalidate operations and reducing latency of PIM-Load operations.

During an example execution phase in which the PIM units primarily execute the workload, the host processor sequentially assigns a transition mode, followed by a PIM mode to the page. While the transition mode and the PIM mode are assigned, the host processor changes the caching policies to the write-through policy and the no-write allocate policy. Responsive to the transition mode being assigned, the host processor implements a flush protocol, which flushes each dirty cache line corresponding to the page from the caches to the memory, and invalidates each cache line in the caches (e.g., whether clean or dirty) corresponding to the page.

Once the flush protocol completes, the host processor assigns the PIM mode to the page of the memory. This combination of caching policies ensures that, once the flush protocol has completed, the caches do not include an incoherent or dirty version of the data of the page. While in PIM mode after the flush protocol has completed, therefore, the host processor processes PIM-Load requests by bypassing the coherence protocol implemented by the cache coherence controller. Therefore, the PIM mode of operation avoids performing lookups in the coherence directory entirely, thereby reducing consumption of shared system resources (e.g., system communication bandwidth, and queue usage in the cache coherence controller), and reducing latency of PIM-Load operations.

Conventional techniques assign a static set of caching policies, and apply the static set of caching policies regardless of which processing resource is executing a workload. In contrast, the described techniques dynamically assign different caching policies during different execution phases based on whether the host processor and/or the PIM units execute the workload during the different execution phases. By doing so, the described techniques enable faster data access speed, reduced latency of PIM-load operations, and/or reduced consumption of system resources, as compared to conventional techniques.

In some aspects, the techniques described herein relate to a computing device, comprising a memory that includes one or more processing-in-memory units, and a host processor that includes one or more caches, the host processor configured to receive a workload that accesses a page of the memory, dynamically assign different modes of operation to the page of the memory during different phases of execution of the workload based on whether the workload is to be executed by the host processor, the one or more processing-in-memory units, or the host processor and the one or more processing-in-memory units during the different phases of execution, and process requests of the workload that access the page of the memory in accordance with the different modes of operation during the different phases of execution, the different modes of operation specifying different caching policies for the page of the memory.

In some aspects, the techniques described herein relate to a computing device, wherein to dynamically assign the different modes of operation to the page, the host processor is configured to populate a page table entry of the page with mode bits indicating the different modes of operation during the different phases of execution.

In some aspects, the techniques described herein relate to a computing device, wherein the host processor further includes a translation lookaside buffer, and the host processor is configured to remove the page of the memory from the translation lookaside buffer in response to a new mode of operation being assigned to the page of the memory.

In some aspects, the techniques described herein relate to a computing device, wherein the workload includes barriers separating the workload into the different phases of execution, and to dynamically assign the different modes of operation to the page of the memory, the host processor is configured to select, in response to encountering a barrier, one of the different modes of operation based on performance metrics attained by the different modes of operation during previous phases of execution.

In some aspects, the techniques described herein relate to a computing device, wherein to dynamically assign the different modes of operation, the host processor is configured to assign a host mode to the page of the memory during a phase of execution in which the host processor primarily executes the workload.

In some aspects, the techniques described herein relate to a computing device, wherein to process the requests of the workload that access the page in accordance with the host mode during the phase of execution, the host processor is configured to write data of the page to the one or more caches in accordance with a write-back policy and a write-allocate policy.

In some aspects, the techniques described herein relate to a computing device, wherein to dynamically assign the different modes of operation, the host processor is configured to assign a hybrid mode to the page of the memory during a phase of execution in which the host processor and the one or more processing-in-memory units execute the workload.

In some aspects, the techniques described herein relate to a computing device, wherein to process the requests of the workload that access the page in accordance with the hybrid mode during the phase of execution, the host processor is configured to write data of the page to the one or more caches in accordance with a write-through policy and a write-allocate policy.

In some aspects, the techniques described herein relate to a computing device, wherein to dynamically assign the different modes of operation, the host processor is configured to sequentially assign a transition mode followed by a processing-in-memory mode during a phase of execution in which the one or more processing-in-memory units primarily execute the workload.

In some aspects, the techniques described herein relate to a computing device, wherein to process the requests of the workload that access the page in accordance with the transition mode and the processing-in-memory mode during the phase of execution, the host processor is configured to write data of the page to the one or more caches in accordance with a write-through policy and a no-write-allocate policy.

In some aspects, the techniques described herein relate to a computing device, wherein the host processor is configured to implement a flush protocol based on the transition mode being assigned, the flush protocol including at least one of flushing and invalidating each cache line corresponding to the page from the one or more caches, the processing-in-memory mode being assigned based on the flush protocol having completed.

In some aspects, the techniques described herein relate to a computing device, wherein the host processor further includes a cache coherence controller, and to process the requests of the workload that access the page in accordance with the transition mode during the phase of execution, the cache coherence controller is configured to receive a processing-in-memory load request for the page of the memory, and perform one or more lookups for the page in a coherence directory of the cache coherence controller based on the flush protocol being in progress.

In some aspects, the techniques described herein relate to a computing device, wherein the host processor further includes a cache coherence controller, and to process the requests of the workload that access the page in accordance with the processing-in-memory mode during the phase of execution, the host processor is configured to receive a processing-in-memory load request for the page of the memory, and bypass one or more lookups for the page in a coherence directory of the cache coherence controller based on the flush protocol having completed.

In some aspects, the techniques described herein relate to a system, comprising a memory module having a memory and one or more processing-in-memory units, and a host processor communicatively coupled to the memory module and having one or more caches, the host processor configured to perform operations including receiving a workload that accesses a page of the memory, dynamically assigning a processing-in-memory mode to the page of the memory during a phase of execution of the workload in which the one or more processing-in-memory units primarily execute the workload, and changing caching policies for the page based on the processing-in-memory mode being assigned, the changed caching policies indicating to process requests of the workload that access the page of the memory in accordance with a write-through policy and a no-write-allocate policy.

In some aspects, the techniques described herein relate to a system, wherein dynamically assigning the processing-in-memory mode includes sequentially assigning a transition mode followed by the processing-in-memory mode during the phase of execution, the operations further including implementing a flush protocol based on the transition mode being assigned, the flush protocol including at least one of flushing and invalidating each cache line corresponding to the page from the one or more caches, the processing-in-memory mode being assigned based on the flush protocol having completed.

In some aspects, the techniques described herein relate to a system, wherein the host processor further includes a cache coherence controller, the operations further including processing a processing-in-memory load request for the page while the transition mode is assigned by sending the processing-in-memory load request to the cache coherence controller, and performing, by the cache coherence controller, one or more lookups for the page in a coherence directory.

In some aspects, the techniques described herein relate to a system, wherein the host processor further includes a cache coherence controller, the operations further including processing a processing-in-memory load request for the page while the processing-in-memory mode is assigned by bypassing one or more lookups for the page in a coherence directory of the cache coherence controller.

In some aspects, the techniques described herein relate to a system, wherein dynamically assigning the processing-in-memory mode includes changing, during execution of the workload, a mode assigned to the page from a different mode to the processing-in-memory mode, and changing the caching policies includes at least one of changing from a write-back policy to the write-through policy and changing from a write-allocate policy to the no-write-allocate policy.

In some aspects, the techniques described herein relate to a method, comprising receiving, by a host processor, a workload that accesses a page of memory, dynamically assigning, by a host processor, a hybrid mode to the page of the memory during a phase of execution of the workload in which the host processor and one or more processing-in-memory units of the memory execute the workload, and changing, by the host processor, caching policies for the page based on the hybrid mode being assigned, the changed caching policies indicating to process requests of the workload that access the page in accordance with a write-through policy, and a write-allocate policy.

In some aspects, the techniques described herein relate to a method, wherein dynamically assigning the hybrid mode includes changing, during execution of the workload, a mode assigned to the page from a different mode to the hybrid mode, and changing the caching policies includes at least one of changing from a write-back policy to the write-through policy and changing from a no-write-allocate policy to the write-allocate policy.

FIG. 1 is a block diagram of a non-limiting example system 100 to implement dynamic caching policies for processing-in-memory. The system includes a device 102 having a host processor 104 and a memory module 106. The host processor 104 includes a core 108, a memory management unit 110, a cache coherence controller 112, and a memory controller 114. Further, the memory module 106 includes a memory 116 and a plurality of processing-in-memory (PIM) units 118.

In accordance with the described techniques, the host processor 104 and the memory module 106 are coupled to one another via one or more wired or wireless connections. Example wired connections include, but are not limited to, buses (e.g., a data bus), interconnects, traces, and planes. Examples of the device 102 include, but are not limited to, supercomputers and/or computer clusters of high-performance computing (HPC) environments, servers, personal computers, laptops, desktops, game consoles, set top boxes, tablets, smartphones, mobile devices, virtual and/or augmented reality devices, wearables, medical devices, systems on chips, and other computing devices or systems.

The host processor 104 is an electronic circuit that performs various operations on and/or using data in the memory 116. Examples of the host processor 104 and/or the core 108 include, but are not limited to, a central processing unit (CPU), a graphics processing unit (GPU), an application specific integrated circuit (ASIC), and a field programmable gate array (FPGA). For example, the core 108 is a processing unit that reads and executes requests and/or instructions (e.g., of software processes 120), examples of which include to add data, to move data, and to branch. Example software processes 120 running on the core 108 of the host processor 104 include an operating system 122, programs 124 (e.g., software applications), virtual machines 126, and containers 128. Although one core 108 is depicted in the example system 100, the host processor 104 includes more than one core 108 in variations, e.g., the host processor 104 is a multi-core processor.

In one or more implementations, the memory module 106 is a circuit board (e.g., a printed circuit board), on which the memory 116 is mounted and includes the PIM units 118. Examples of the memory module 106 include, but are not limited to, a TransFlash memory module, a single in-line memory module (SIMM), and a dual in-line memory module (DIMM). In one or more implementations, the memory module 106 is a single integrated circuit device that incorporates the memory 116 and the PIM units 118 on a single chip. In some examples, the memory module 106 is composed of multiple chips that implement the memory 116 and the PIM units 118 that are vertically ("3D") stacked together, are placed side-by-side on an interposer or substrate, or are assembled via a combination of vertical stacking or side-by-side placement.

The memory 116 is a device or system that is used to store information, such as for immediate use in a device, e.g., by the core 108 of the host processor 104 and/or by the PIM units 118. In one or more implementations, the memory 116 corresponds to semiconductor memory where data is stored within memory cells on one or more integrated circuits. In at least one example, the memory 116 corresponds to or includes volatile memory, examples of which include random-access memory (RAM), dynamic random-access memory (DRAM), synchronous dynamic random-access memory (SDRAM), and static random-access memory (SRAM). Alternatively or in addition, the memory 116 corresponds to or includes non-volatile memory, examples of which include solid state disks (SSD), flash memory, read-only memory (ROM), programmable read-only memory (PROM), erasable programmable read-only memory (EPROM), and electronically erasable programmable read-only memory (EEPROM). Thus, the memory 116 is configurable in a variety of ways that support dynamic caching policies for processing-in-memory without departing from the spirit or scope of the described techniques.

Broadly, the memory management unit 110 is an electronic circuit configured to perform various memory management operations including, for example, virtual-to-physical address translation. As part of this, the memory management unit 110 includes address translation logic 130 (e.g., implemented in circuitry of the memory management unit 110) employed for virtual-to-physical address translation. Broadly, the page tables 132 and the PTEs are data structures leveraged by the memory management unit 110 and/or the address translation logic 130 to translate virtual memory addresses (e.g., received from the software processes 120 running on the core 108), to physical memory addresses, and vice versa. More specifically, each software process 120 operates in a separate virtual address space, and the memory management unit 110 includes a page table 132 for each software process 120. Further, a PTE 134 points to a page 136 of physical memory, e.g., the PTE 134 includes a mapping of a virtual page address to a physical page address. In addition, the memory management unit 110 includes a translation lookaside buffer (TLB) 138, as shown. Broadly, the TLB 138 is a hardware cache that caches recently used PTEs 134, from which virtual-to-physical address mappings are accessible relatively faster than the page tables 132. In one example, the TLB is implemented using semiconductor memory where data is stored within memory cells on one or more integrated circuits. Thus, in variations, PTEs 134 are stored in the memory 116, or cached in the caches 142 of the core 108 or the TLB 138 of the memory management unit 110

The memory controller 114 is an electronic circuit that manages the flow of data to and from the memory 116. By way of example, the memory controller 114 includes logic to read and write to the memory 116. In one or more implementations, the memory controller 114 also includes logic to interface with the PIM units 118, e.g., to provide requests to the PIM units 118 for processing. The memory controller 114 also interfaces with the core 108. For instance, the memory controller 114 receives requests from the core 108 which involve accessing the memory 116 and/or the PIM units 118 and provides data to the core 108 for processing.

More specifically, an access request including a virtual page address is issued by a software process 120 running on the core 108. Further, the access request is forwarded to the memory management unit 110, which translates the virtual page address to a physical page address. The memory controller 114 then receives the access request including the physical page address, and accesses the data from the physical page address in memory 116. In one or more implementations, the memory controller 114 is communicatively and/or topologically located between the core 108 and the memory module 106, and the memory controller 114 interfaces with the core 108 (e.g., via the memory management unit 110) and the memory module 106.

Broadly, the PIM units 118 correspond to in-memory processors, e.g., implemented in circuitry of the memory module 106. The in-memory processors are implemented with example processing capabilities ranging from relatively simple (e.g., for performing addition, comparison, maximum, and/or minimum operations) to relatively complex, e.g., a CPU/GPU compute core. Broadly, the host processor 104 is configured to offload memory bound computations to the PIM units 118. To do so, the host processor 104 generates PIM requests (e.g., by the core 108) and transmits the PIM requests (e.g., by the memory controller 114) to the memory module 106. The PIM units 118 receive the PIM requests and process the PIM requests utilizing data stored in the memory 116. More specifically, a respective PIM unit 118 is communicatively coupled to a set of one or more banks 140 of the memory 116, as shown, and the respective PIM unit 118 processes PIM requests utilizing data stored in the set of one or more banks 140. While the PIM units 118 are illustrated as being disposed within the memory module 106, it is to be appreciated that in some examples, the described benefits of dynamic caching policies for processing-in-memory are realizable through near-memory processing implementations in which one or more of the PIM units 118 are disposed in closer proximity to the memory 116 (e.g., in terms of data communication pathways and/or topology) than the core 108 of the host processor 104.

Processing-in-memory using in-memory processors contrasts with processing data using the host processor 104. Indeed, processing data in memory 116 using the host processor 104 involves communicating data from the memory 116 to the core 108 of the host processor 104, and processing the data using the core 108 rather than the PIM units 118. In various scenarios, the data produced by the core 108 as a result of processing the obtained data is written back to the memory 116, which involves communication of the data back to the memory 116. In terms of data communication pathways, the core 108 is further away from the memory 116 than the PIM units 118. Given this, processing data using the PIM units 118 enables increased computer performance while reducing data transfer energy and increasing memory bandwidth, as compared to processing data using the host processor 104. Additionally, processing data using the PIM units 118 alleviates memory performance and energy bottlenecks by moving memory intensive computations closer to memory 116.

As shown, the core 108 of the host processor 104 includes one or more caches 142, where data is stored. By way of example, the core 108 includes a cache hierarchy, and the caches 142 of the cache hierarchy include a level 1 (L1) cache, a level 2 (L2) cache, and a level 3 (L3) cache. Notably, the caches 142 corresponds to semiconductor memory where data is stored within memory cells on one or more integrated circuits. In response to receiving an access request to access data of a memory address (e.g., from a software process 120 running on the core 108), the core 108 checks whether the caches 142 include the data of the memory address. If the caches 142 include the data, then the core 108 accesses the data from the caches 142 rather than the memory 116. If, however, the caches 142 do not include the data, then the core 108 accesses the data from the memory 116 rather than the caches 142. In terms of data communication pathways, the caches 142 are closer to the core 108 than the memory 116, and as such, the core 108 accesses data in the caches 142 faster than data in the memory 116.

It should also be noted that many processing workloads exhibit infrequent reuse of data, e.g., data that is accessed by a workload is not likely to be accessed by the workload again in the near future. Since the caches 142 often store the most recently accessed data, these workloads also exhibit a low cache hit rate, e.g., data that is accessed is infrequently present in the caches 142. Thus, executing workloads that exhibit infrequent reuse of data using the host processor 104 further increases memory bandwidth consumption, data transfer latency, and data transfer energy. Accordingly, it is particularly beneficial to process these workloads using the PIM units 118.

In one or more examples, the caches 142 and the memory 116 store different versions of corresponding data. For instance, the core 108 modifies data of a cache line that is stored in a cache 142, and as such, the corresponding data of the cache line that is stored in the memory 116 is stale. For this reason, the cache coherence controller 112 (e.g., implemented in circuitry of the host processor 104) is employed to enforce cache coherence (e.g., uniformity of data) among the caches 142 and the memory 116. As part of enforcing cache coherence, the cache coherence controller 112 includes a coherence directory 144, which is a data structure (e.g., maintained in local memory of the cache coherence controller 112) that tracks cache lines that are present in the caches 142. In response to a cache line being added to the caches 142, for example, the cache coherence controller 112 creates an entry in the coherence directory 144 that includes a range of memory addresses corresponding to the cache line that has been added to the caches 142.

Broadly, the cache coherence controller 112 receives (e.g., from the core 108) an access request to access data of a particular memory address from the memory 116, and in response, performs a lookup in the coherence directory 144 for an entry representing a cache line that includes the particular memory address. Broadly, a lookup in the coherence directory refers to a process (e.g., implemented by the cache coherence controller 112) of querying the coherence directory 144 to retrieve information about where the cache line is located. A coherence directory miss occurs when there is no entry in the coherence directory 144 having an address range that includes the particular memory address, meaning that the data of the memory address is not in the caches 142. In contrast, a coherence directory hit occurs when there is an entry in the coherence directory 144 having an address range that includes the particular memory address, meaning that the data of the memory address is in the caches 142.

Responsive to a coherence directory miss, the cache coherence controller 112 forwards the access request to the memory controller 114, which accesses the data from the memory 116. Responsive to a coherence directory hit, the cache coherence controller 112 determines whether the cache line that includes the data is "clean" or "dirty." Here, a cache line is dirty if the cache line has been modified since being cached, and as such, the corresponding data in the memory 116 is stale. In contrast, a cache line is clean if the cache line in the caches 142 and the corresponding data in the memory 116 are coherent, and as such, the memory 116 stores the latest version of the corresponding data. In various implementations, the cache coherence controller 112 evaluates a coherence state of the cache line (e.g., included as part of the entry in the coherence directory 144) to determine whether the cache line is clean or dirty.

If the cache line is found to be clean, the cache coherence controller 112 sends invalidate instructions to the core 108 instructing the core 108 to invalidate the cache line in the caches 142, e.g., without flushing the data of the cache line. Here, "invalidating" the cache line means that the cache line in the caches 142 is made invalid, and therefore, a future request to access the cache line will be carried out by accessing the data from the memory 116. This ensures that future accesses to the cache line by the host processor 104 will not read or modify (e.g., make dirty) the cache line in the caches 142. If the cache line is found to be dirty, the cache coherence controller 112 sends flush and invalidate instructions to the core 108 instructing the core 108 to flush the data of the cache line from the caches 142, and invalidate the cache line in the caches 142. Here, "flushing" the cache line means that the modified data of the cache line is written to the corresponding location in memory 116. Flushing the cache line ensures that the memory 116 stores the latest version of the cache line data.

Once the cache coherence controller 112 receives response signals (e.g., sent from the core 108) indicating that the cache line has been flushed and/or invalidated, the access request is forwarded to the memory controller 114, which accesses the data from the memory 116. This process of performing lookup(s) in the coherence directory 144 for a memory address of an access request, forwarding the access request to the memory controller in response to a coherence directory miss, and flushing and/or invalidating the data in response to a coherence directory hit based on whether the data is found to be clean or dirty is referred to herein as a "coherence protocol."

As previously mentioned, each PIM unit 118 is configured to operate on multiple banks 140 of the memory 116. Further, in various implementations, a respective PIM unit 118 is configured to operate on each of the banks 140 in parallel to execute a single PIM command. Consider an example in which the respective PIM unit 118 operates on eight banks 140 of the memory, and the PIM unit 118 receives a PIM-Load request that requests the PIM unit 118 to load data from a particular row and column address of the memory 116 into registers. To execute the PIM-Load command, the PIM unit 118 reads the data of the particular row and column address from each of the eight banks 140 in parallel.

Since PIM-Load requests involve reading data from the banks 140 of the memory 116 into registers of PIM units 118, the memory 116 is to contain the latest version of data requested by the PIM-Load requests in order to be functionally correct. Accordingly, when a PIM-Load request is issued by the core 108, the PIM-Load request is typically forwarded to the cache coherence controller 112 which performs the aforementioned coherence protocol. Since the PIM-Load request touches multiple banks 140 of the memory 116, however, the PIM-Load request triggers many lookups in the coherence directory 144—one lookup for each of the banks 140 of the PIM unit 118 to which the PIM-Load request is to be sent. This negatively impacts performance by increasing contention for system resources (e.g., because multiple flush/invalidate instructions and responses are communicated over shared communication channels, and lookups clog shared queues of the cache coherence controller 112) and increasing latency of PIM-Load operations (e.g., because flushing and invalidating occurs on the critical path, and therefore, PIM-Load requests stall until the flush and invalidate operations have completed).

As previously mentioned, the host processor 104 accesses data in the caches 142 faster than data in the memory 116. Thus, during phases of execution of a workload in which the host processor 104 executes the workload, it is desirable to store data of the workload in the caches 142 for faster data access. During phases of execution of a workload in which the PIM units 118 execute the workload, it is desirable to store the latest version of data of the workload in the memory 116 in order to avoid the increased latency of flushing dirty data from the caches 142 to the memory 116, e.g., which is typically a longer latency operation than just invalidating the data. For at least these reasons, different caching policies are optimal for different execution phases of a workload depending on whether the host processor 104 and/or the PIM units 118 execute the workload during the different execution phases.

Broadly, the caching policies control whether and when data is written to the caches 142, and whether data that is written to the caches 142 is also copied to the memory 116. Example caching policies include a write-back policy, a write-through policy, a write-allocate policy, and a no-write allocate policy. The write-back policy and the write-through policy are write policies, dictating what happens when data is written to the caches 142. Whenever data is written to the caches 142 in a write-through policy, the data is also written to a corresponding location in the memory 116. In accordance with a write-back policy, data is written to the memory 116 when the cache line containing the data is evicted from the caches 142, e.g., a write operation in the caches 142 is not immediately copied (or written-through) to the memory 116. The write-allocate policy and the no-write-allocate policy are write miss policies, dictating what happens when a write operation misses in the caches 142, e.g., the data requested by the write operation is not present in the caches 142. When a write miss occurs in accordance with a write-allocate policy, the data is fetched from the memory 116 into the caches 142, and then the write operation is carried out in the caches 142. When a write miss occurs in accordance with a no-write allocate policy, the write operation is carried out in the memory 116, and the written data is not copied to the caches 142.

Accordingly, the described techniques provide functionality for dynamically assigning different modes of operation to a workload 146 during different phases of execution of the workload 146. Broadly, the different modes of operation specify different caching policies that are assigned to the pages 136 of the workload 146.

To assign a mode of operation to the pages 136 of a workload 146, the host processor 104 receives a workload 146 (e.g., from a software process 120 running on the core 108) that accesses one or more pages 136 of memory. In addition, the host processor 104 receives an indication of a phase of execution 148 that the workload 146 is entering. In one or more implementations, the phase of execution 148 indicates whether the workload 146 is to be primarily executed by the host processor 104, the PIM units 118, or the host processor 104 and the PIM units 118. In one example, the phase of execution 148 is a host phase of execution indicating that the host processor 104 primarily executes the workload 146 during the phase of execution 148. In another example, the phase of execution 148 is a hybrid phase of execution indicating that the host processor 104 and the PIM units 118 primarily execute the workload 146 during the phase of execution 148. In yet another example, the phase of execution 148 is a PIM phase of execution indicating that the PIM units 118 primarily execute the workload 146 during the phase of execution 148.

Here, "primary execution" by a processing mechanism (e.g., the PIM units 118 or the host processor 104) refers to exclusive or near-exclusive execution by the processing mechanism. In at least one example, the exclusive or near-exclusive execution during a phase of execution is defined as at least a threshold percentage of requests/instructions of a workload 146 being processed by the processing mechanism during the phase of execution.

In response to receiving the indication of the phase of execution 148 that the workload 146 is entering, the host processor 104 dynamically assigns a mode of operation to the one or more pages 136 of the workload 146 based on the phase of execution 148. To do so, the host processor 104 populates the PTEs 134 of the pages 136 accessed by the workload 146 with mode bits 150 indicating the mode of operation corresponding to the indicated phase of execution 148. In one or more implementations, the mode bits 150 of a PTE 134 are bits dedicated to storing a binary indicator of the mode of operation that is assigned to the page 136 that the PTE 134 points to. For instance, the host processor 104 populates the mode bits 150 with a host mode of operation based on a host phase of execution 148 being indicated for the workload 146.

In addition, the host processor 104 populates the mode bits 150 with a hybrid mode of operation based on a hybrid phase of execution 148 being indicated for the workload 146. Moreover, the host processor 104 sequentially populates the mode bits 150 with a transition mode of operation, followed by a PIM mode of operation based on a PIM phase of execution 148 being indicated for the workload.

After the mode of operation corresponding to the phase of execution 148 is assigned to the pages 136 of the workload 146, subsequent write requests to the pages 136 of the workload 146 are processed in accordance with the caching policies corresponding to the assigned mode of operation. By way of example, a subsequent write request to access a page 136 is issued by a software process 120 running on the core 108, and the subsequent write request is received by the memory management unit 110. In accordance with the described techniques, the address translation logic 130 translates the virtual page address of the access request to a physical page address, and additionally reads the mode of operation from the mode bits 150 as part of the address translation process. Further, the host processor 104 processes the subsequent write request by writing data of the page 136 to the caches 142 in accordance with the caching policies corresponding to the mode of operation.

In examples in which the host mode of operation is assigned to the page 136, the host processor 104 processes subsequent write requests to the page 136 by writing data to the caches 142 in accordance with the write-back policy and the write-allocate policy. Under the write-back policy, data is written to the caches 142 without using extra system resources (e.g., communication bandwidth) preemptively writing the data to the memory 116. Under the write-allocate policy, a write operation that misses in the caches 142 is carried out by fetching the data from the memory 116 into the caches 142 where the write operation is performed, thereby ensuring the caches 142 have the latest version of the data in case the data is accessed again. This combination of caching policies improves performance during host execution phases by providing a higher likelihood that data operated on by the workload 146 is present in the caches 142, thereby increasing data access speed for the host processor 104. In addition, this combination of caching policies reduces the number of write operations sent to the memory 116 leading to reduced consumption of shared communication bandwidth for the system 100.

In examples in which the hybrid mode of operation is assigned to the page 136, the host processor 104 processes subsequent write requests to the page 136 by writing data to the caches 142 in accordance with the write-through policy and the write-allocate policy. Under the write-allocate policy, a write operation that misses in the caches 142 is carried out by fetching the data from the memory 116 into the caches 142, where the write operation is performed. Under the write-through policy, data is preemptively written to the memory 116 whenever data is written to the caches 142. Thus, in case of a write operation missing in the caches 142, data is fetched from the memory 116 and modified in the caches 142 (based on the write-allocate policy), and the modified data is additionally written to the memory 116 (based on the write-through policy). In other words, regardless of whether a write operation hits or misses in the caches 142, this combination of caching policies writes the latest version of data to the caches 142 and the memory 116.

Therefore, this combination of caching policies improves performance during hybrid execution phases by providing a higher likelihood that data operated on by the workload 146 is present in the caches 142, thereby leading to increased data access speed for the host processor 104. In addition, this combination of caching policies reduces the likelihood that dirty data is present in the caches 142, thereby avoiding the increased latency of flushing dirty data requested by a PIM-load operation from the caches 142 to the memory 116. While this combination of policies causes increased write operations to be sent to the memory 116, the aforementioned performance benefits outweigh the communication bandwidth consumption induced by the extra write operations.

In examples in which the PIM mode of operation or the transition mode of operation is assigned to the page 136, the host processor 104 processes subsequent write requests to the page 136 by writing data to the caches 142 in accordance with the write-through policy and the no-write allocate policy. Under the write-through policy, data is preemptively written to the memory 116 whenever data is written to the caches 142. Under the no-write allocate policy, a write operation that misses in the caches 142 is carried out by modifying the data in the memory 116, e.g., without writing the modified data to the caches 142. In response to the transition mode being assigned, the host processor 104 is configured to implement a flush protocol, which involves flushing each dirty cache line corresponding to the page 136 from the caches 142 to the memory 116, and invalidating each cache line in the caches 142 (e.g., whether clean or dirty) corresponding to the page 136.

Once the flush protocol completes, the host processor assigns the PIM mode of operation to the page 136. This combination of caching policies ensures that, once the flush protocol has completed, the caches 142 do not include a modified (e.g., dirty or incoherent) version of the data of the page 136. While operating in PIM mode after the flush protocol has completed, therefore, the host processor 104 processes subsequent PIM-Load requests by bypassing the coherence protocol implemented by the cache coherence controller 112. For instance, the core 108 sends the subsequent PIM-Load requests directly from the memory management unit 110 (after address translation is performed) to the memory controller 114. In other words, the host processor 104 avoids performing the multiple lookups typically triggered by a single PIM-Load request during PIM execution phases (after the flush protocol has completed). Thus, the PIM mode of operation improves performance during PIM execution phases by reducing contention for system resources (e.g., by avoiding multiple sets of flush and invalidate instructions/responses being communicated, and avoiding clogging the shared queues of the cache coherence controller 112 with duplicated lookups triggered by a single PIM-Load request), and reducing latency of PIM-Load operations (e.g., by avoiding critical path flush and invalidate operations that stall PIM-load operations).

As previously mentioned, the host mode of operation is assigned based on near-exclusive execution of a workload by the host processor 104, while the PIM mode of operation is assigned based on near-exclusive execution of a workload by the PIM units 118. In one or more implementations, the threshold for near-exclusive execution by a processing resource is based on a cost-benefit analysis of operating in a particular mode of operation. For example, the host processor 104 determines to either continue operating in a host mode of operation or transition to a different mode of operation based on a comparison between a degree of stalling incurred by PIM-load requests (e.g., cost of operating in the host mode) to a number of write operations that are prevented from being sent to memory 116 (e.g., benefit of operating in the host mode). In another example, the host processor 104 determines to either continue operating in a PIM mode of operation or transition to a different mode of operation based on a comparison between a number of accesses by the host processor 104 (e.g., cost of operating in the PIM mode) to a number of PIM-load requests that bypass the coherence directory 144 (e.g., benefit of operating in the PIM mode). Notably, the number of accesses by the host processor 104 is a cost because, in the PIM mode of operation, each access by the host processor 104 misses in the caches 142 and results in a longer latency access from memory 116.

Conventional techniques generally assign a static set of caching policies for the system 100, and apply the static of caching policies regardless of whether the PIM units 118 and/or the host processor 104 primarily executes a workload. In contrast, the host processor 104 dynamically assigns different modes of operation to the pages 136 of the workload 146 during different phases of execution 148 of the workload 146, e.g., any one or any combination of the host mode of operation, the hybrid mode of operation, and the PIM mode of operation are assignable to a respective page 136 of the workload 146 at different times during execution of the workload 146.

Therefore, the described techniques improve computational efficiency for both PIM workloads and non-PIM workloads, by implementing different caching policies during different execution phases based on which processing mechanism (e.g., the host processor 104 and/or the PIM units 118) is expected to execute the workload during the different execution phases. Potential performance benefits resulting therefrom include: (1) faster data access speed for the host processor, (2) reduced latency of PIM-Load operations, and (3) reduced consumption of system resources.

Figure 2:
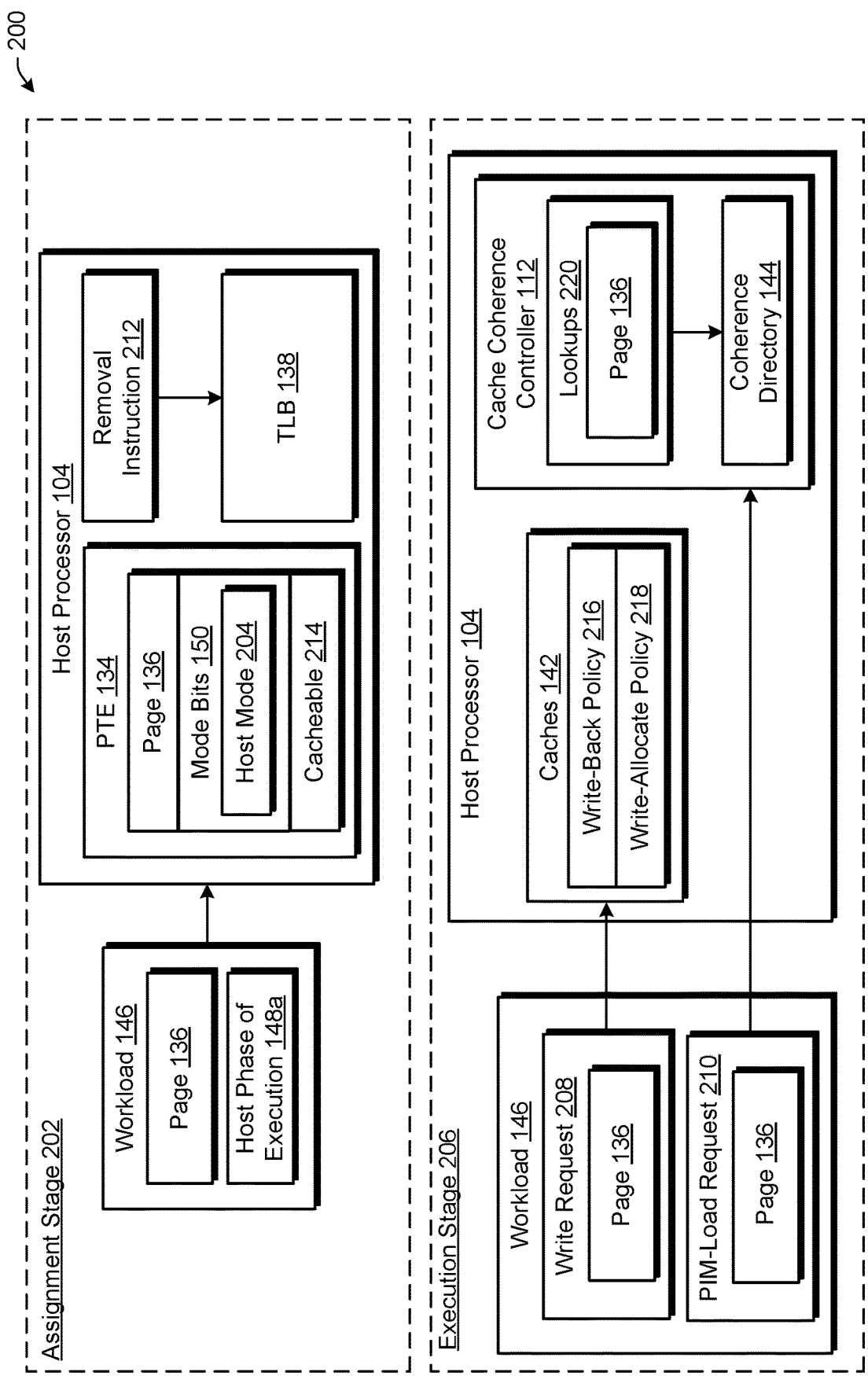
FIG. 2 depicts a non-limiting example showing operation of a host processor during a host phase of execution.

FIG. 2 depicts a non-limiting example 200 showing operation of a host processor during a host phase of execution. In particular, the example 200 includes an assignment stage 202 showing operation of the host processor 104 to assign the host mode 204 of operation when the host phase of execution 148a is specified for the workload 146. In addition, the example 200 includes an execution stage 206 showing operation of the host processor 104 to execute write requests 208 and PIM-Load requests 210 after the host mode 204 has been assigned.

During the assignment stage 202, the host processor 104 receives the workload 146 that includes a page 136 of memory 116, and an indication that the workload 146 is entering a host phase of execution 148a in which the host processor 104 primarily executes the workload 146. In response to receiving the indication of the host phase of execution 148a, the host processor 104 populates the mode bits 150 of the PTE 134 corresponding to the page 136 with an indication of the host mode 204 of operation. In addition, the host processor 104 issues a removal instruction 212 to remove the PTE 134 corresponding to the page 136 from the TLB 138 (if the PTE 134 is present in the TLB 138). This is because once the mode bits 150 of the PTE 134 in the page table 132 are updated, the corresponding PTE 134 in the TLB 138 becomes stale. Furthermore, the host processor 104 marks the page 136 as cacheable 214 (e.g., by populating one or more cacheability bits of the PTE 134) because the combination of caching policies corresponding to the host mode 204 of operation involve writing data of the page 136 to the caches 142.

During the execution stage 206 of the host phase of execution 148a, the host processor 104 receives a write request 208 to the page 136 as part of the workload 146. Here, the write request 208 is forwarded to the memory management unit 110, and the address translation logic 130 translates the virtual memory address of the page 136 to a physical memory address of the page 136. During the translation process, the address translation logic 130 additionally reads the host mode 204 from the mode bits 150. Based on the host mode 204 being assigned to the page 136, the host processor 104 processes the write request 208 in accordance with the write-back policy 216 and the write-allocate policy 218.

Also during the execution stage 206, the host processor 104 receives a PIM-load request 210 as part of the workload 146. Under the write-back policy 216 and the write-allocate policy 218, it is possible for the data of the page 136 to be modified in the caches 142, and as such, the corresponding data in the memory 116 is potentially stale. Therefore, the PIM-Load request 210 is forwarded to the cache coherence controller 112, which performs the aforementioned coherence protocol. In particular, the cache coherence controller 112 performs a number of lookups 220 for the page 136 in the coherence directory 144. Further, the number of lookups 220 is equal to the number of banks 140 that a PIM unit 118 that is configured to process the PIM-Load request 210 operates on.

Figure 3:
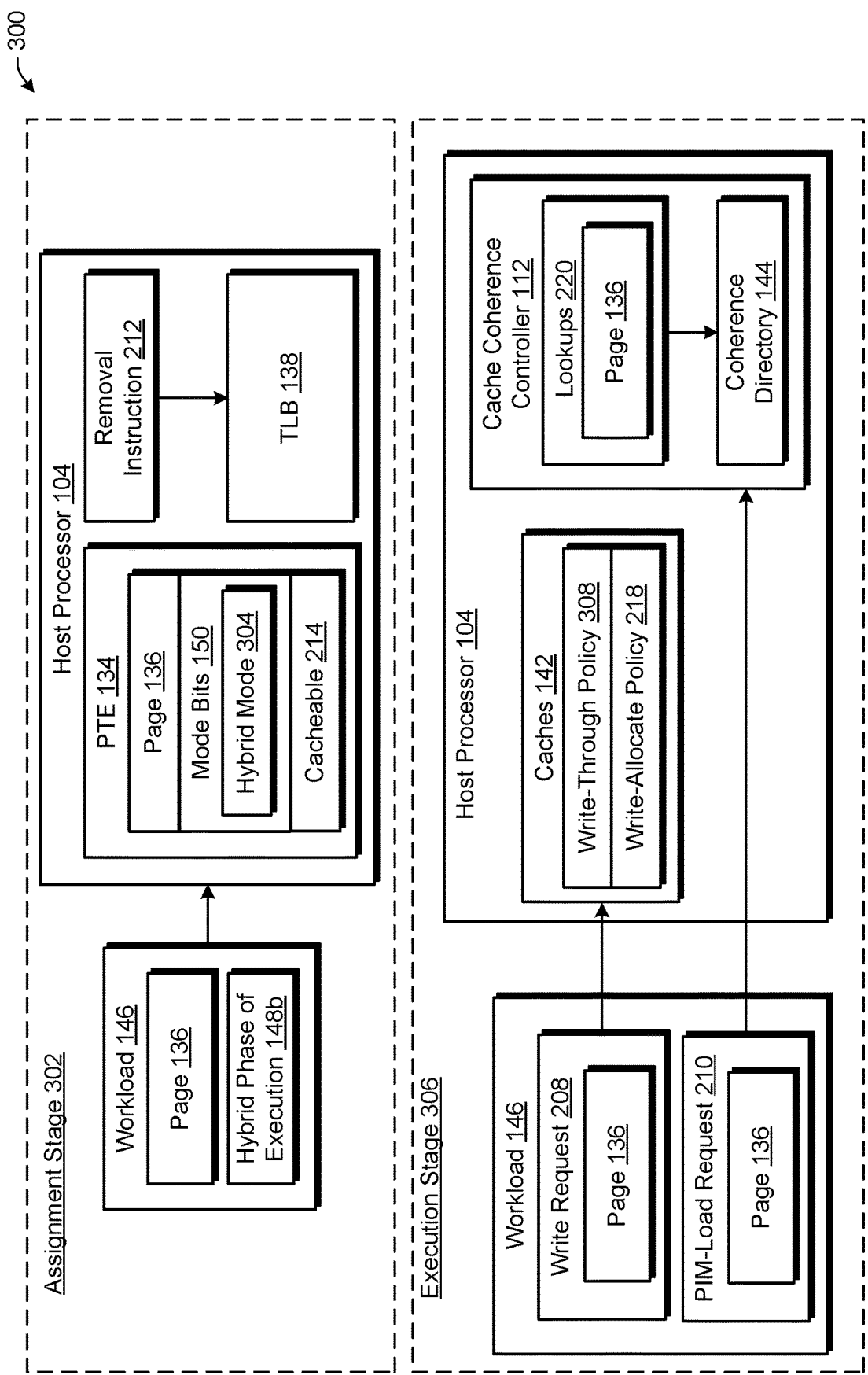
FIG. 3 depicts a non-limiting example showing operation of a host processor during a hybrid phase of execution.

FIG. 3 depicts a non-limiting example 300 showing operation of a host processor during a hybrid phase of execution. In particular, the example 300 includes an assignment stage 302 showing operation of the host processor 104 to assign the hybrid mode 304 of operation when the hybrid phase of execution 148b is specified for the workload 146. In addition, the example 300 includes an execution stage 306 showing operation of the host processor 104 to execute write requests 208 and PIM-Load requests 210 after the hybrid mode 304 has been assigned.

During the assignment stage 302, the host processor 104 receives the workload 146 that includes a page 136 of memory, and an indication that the workload 146 is entering a hybrid phase of execution 148b in which the host processor 104 and the PIM units 118 execute the workload 146. In response to receiving the indication of the hybrid phase of execution 148b, the host processor 104 populates the mode bits 150 of the PTE 134 corresponding to the page 136 with an indication of the hybrid mode 304 of operation. In addition, the host processor 104 issues a removal instruction 212 to remove the PTE 134 corresponding to the page 136 from the TLB 138 (if the PTE 134 is present in the TLB). This is because once the mode bits 150 of the PTE 134 in the page table 132 are updated, the corresponding PTE 134 in the TLB 138 becomes stale. Furthermore, the host processor 104 marks the page 136 as cacheable 214 because the combination of caching policies corresponding to the hybrid mode 304 of operation involve writing data of the page 136 to the caches 142.

During the execution stage 306 of the hybrid phase of execution 148b, the host processor 104 receives a write request 208 to the page 136 as part of the workload 146. Here, the write request 208 is forwarded to the memory management unit 110, and the address translation logic 130 translates the virtual memory address of the page 136 to a physical memory address of the page 136. During the translation process, the address translation logic 130 additionally reads the hybrid mode 304 from the mode bits 150. Based on the hybrid mode 304 being assigned to the page 136, the host processor 104 processes the write request 208 in accordance with the write-through policy 308 and the write-allocate policy 218.

Also during the execution stage 306, the host processor 104 receives a PIM-load request 210 as part of the workload 146. Under the write-through policy 308 and the write-allocate policy 218, it is possible for the data of the page 136 to be modified in the caches 142, and as such, the corresponding data in the memory 116 is potentially stale. Therefore, the PIM-Load request 210 is forwarded to the cache coherence controller 112, which performs the aforementioned coherence protocol. In particular, the cache coherence controller 112 performs a number of lookups 220 for the page 136 in the coherence directory 144. Further, the number of lookups 220 is equal to the number of banks 140 that a PIM unit 118 configured to process the PIM-Load request 210 operates on.

Figure 4:
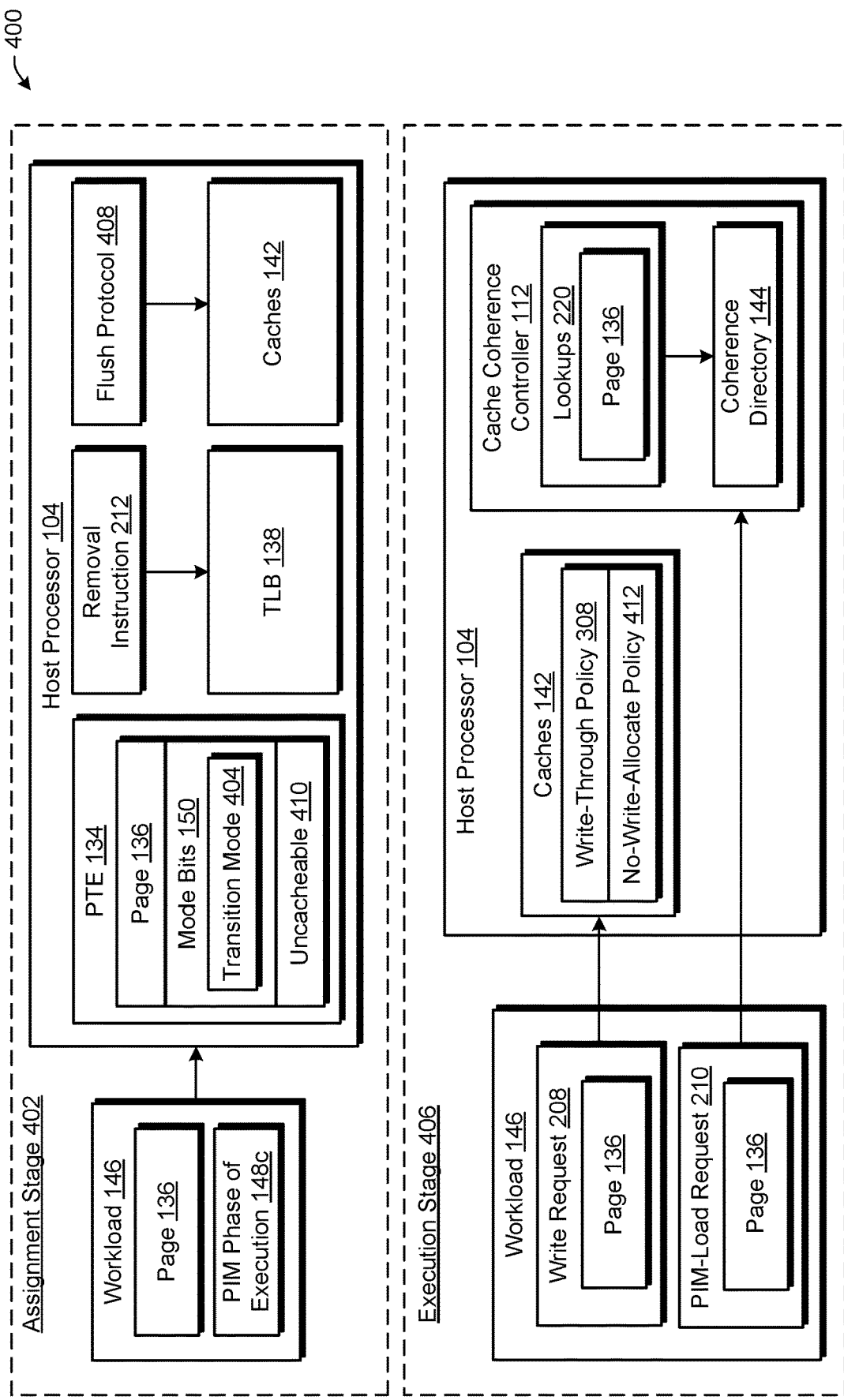
FIG. 4 depicts a non-limiting example showing operation of a host processor during a transition phase of execution.

FIG. 4 depicts a non-limiting example 400 showing operation of a host processor during a transition phase of execution. In particular, the example 400 includes an assignment stage 402 showing operation of the host processor 104 to assign the transition mode 404 of operation when the PIM phase of execution 148c is specified for the workload 146. In addition, the example 400 includes an execution stage 406 showing operation of the host processor 104 to execute write requests 208 and PIM-Load requests 210 after the transition mode 404 has been assigned.

During the assignment stage 402, the host processor 104 receives the workload 146 that includes a page 136 of memory 116, and an indication that the workload 146 is entering a PIM phase of execution 148c in which the PIM units 118 primarily execute the workload 146. In response to receiving the indication of the PIM phase of execution 148c, the host processor 104 populates the mode bits 150 of the PTE 134 corresponding to the page 136 with an indication of the transition mode 404 of operation. In addition, the host processor 104 issues a removal instruction 212 to remove the PTE 134 corresponding to the page 136 from the TLB 138 (if the PTE 134 is present in the TLB). This is because once the mode bits 150 of the PTE 134 in the page table 132 are updated, the corresponding PTE 134 in the TLB 138 becomes stale.

As further discussed below, the host processor 104 is configured to implement a flush protocol 408 in response to the PIM phase of execution 148c being specified for the workload 146. Broadly, the flush protocol 408 involves flushing each dirty cache line corresponding to the page 136 from the caches 142 to the memory 116, and invalidating each cache line in the caches 142 (e.g., whether clean or dirty) corresponding to the page 136. As part of this, the host processor 104 includes a separate hardware processor, referred to herein as a walker (not shown), which is an electronic circuit that is configured to identify individual cache lines in the caches 142 corresponding to the page 136.

In one or more implementations, the walker is configured to walk the contents of the coherence directory 144, and identify each cache line corresponding to the page 136 having an entry in the coherence directory 144. Additionally or alternatively, the walker is configured to walk the contents of the caches 142, and identify each cache line corresponding to the page 136 directly from the caches 142. Additionally or alternatively, the walker is configured to iterate over each memory address corresponding to the page 136, and identify each cache line included as part of the iterated memory addresses.

Regardless, the walker is configured to issue flush instructions to flush identified cache lines that are dirty/incoherent in the caches 142. In addition, the walker is configured to issue invalidate instructions to invalidate each identified cache line in the caches 142 (regardless of whether the identified cache line is clean or dirty). Although these examples are described using instructions which flush and/or invalidate individual cache lines, it is to be appreciated that the flush protocol 408 is carried out using instructions which flush and/or invalidate entire cache(s) 142 in variations.

In addition, the host processor 104 marks the page 136 as uncacheable 410 during the assignment stage 402. Accordingly, any write requests 208 during the execution stage 406 bypass the caches 142 and are performed in memory 116. This is because the PIM mode of operation being transitioned to involves keeping data of the the coherence protocol implemented by the cache coherence controller 112. Further, by marking the page 136 as uncacheable, the host processor 104 enables the flush protocol 408 to be asynchronous. In other words, by marking the page 136 as uncacheable and thereby ensuring that future accesses to the page 136 do not write data of the page 136 to the caches 142, the page 136 remains accessible while the flush protocol 408 is in progress.

During the execution stage 406 of the transition phase of execution, the host processor 104 receives a write request 208 to the page 136 as part of the workload 146. Here, the write request 208 is forwarded to the memory management unit 110, and the address translation logic 130 translates the virtual memory address of the page 136 to a physical memory address of the page 136. During the translation process, the address translation logic 130 additionally reads the transition mode 404 from the mode bits 150. Based on the transition mode 404 being assigned to the page 136, the host processor 104 processes the write request 208 in accordance with the write-through policy 308 and the no-write-allocate policy 412.

Also during the execution stage 406, the host processor 104 receives a PIM-load request 210 as part of the workload 146. Since the flush protocol 408 is still in progress, it is possible for the data of the page 136 to be dirty/incoherent in the caches 142, and as such, the corresponding data in the memory 116 is potentially stale. Therefore, the PIM-Load request 210 is forwarded to the cache coherence controller 112, which performs the aforementioned coherence protocol. In particular, the cache coherence controller 112 performs a number of lookups 220 for the page 136 in the coherence directory 144. Further, the number of lookups 220 is equal to the number of banks 140 that a PIM unit 118 that is configured to process the PIM-Load request 210 operates on.

Figure 5:
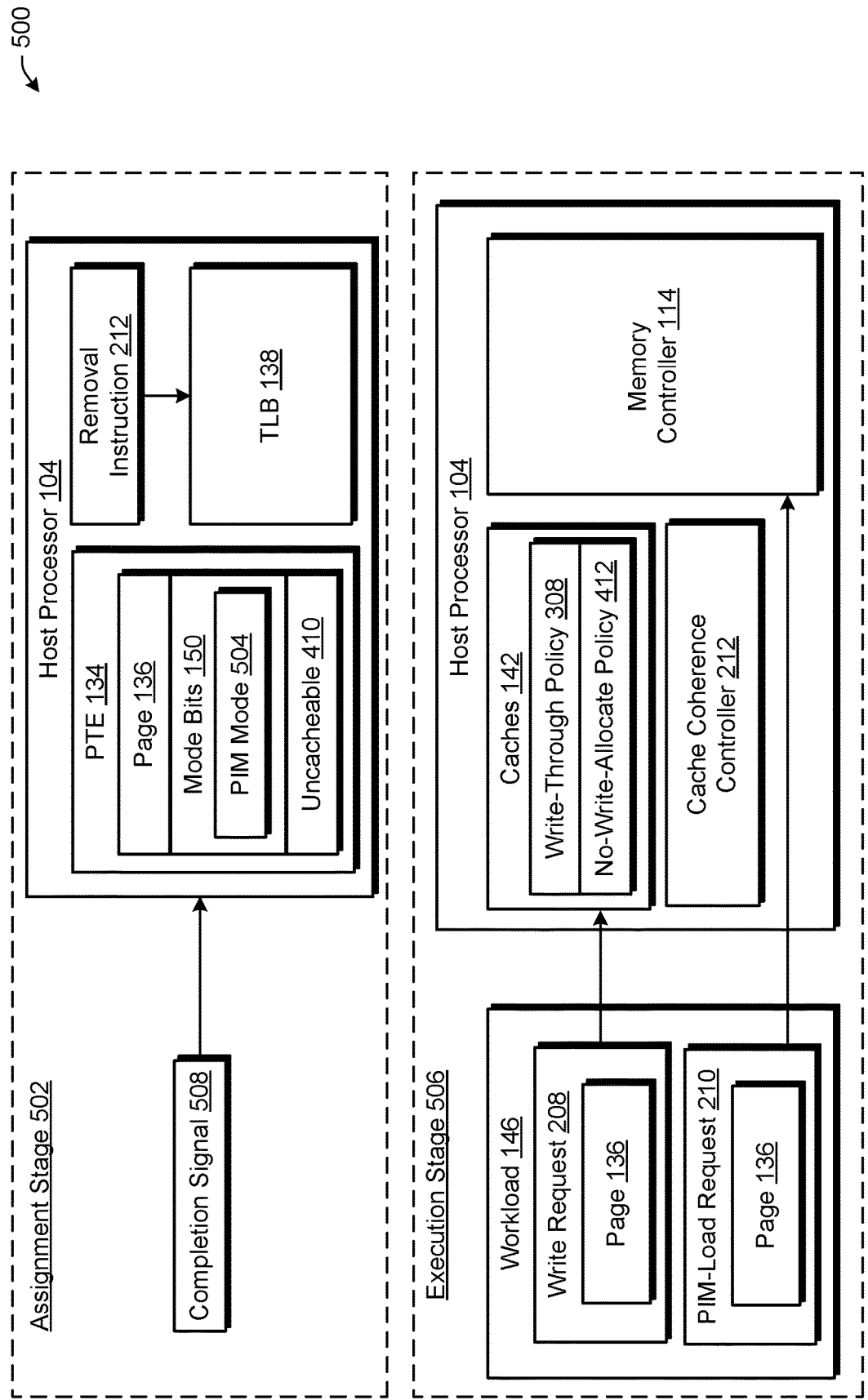
FIG. 5 depicts a non-limiting example showing operation of a host processor during a processing-in-memory phase of execution.

FIG. 5 depicts a non-limiting example 500 showing operation of a host processor during a processing-in-memory phase of execution. In particular, the example 500 includes an assignment stage 502 showing operation of the host processor 104 to assign the PIM mode 504 of operation when the flush protocol 408 has completed. In addition, the example 500 includes an execution stage 506 showing operation of the host processor 104 to execute write requests 208 and PIM-Load requests 210 after the PIM mode 504 has been assigned.

During the assignment stage 502, the host processor receives a completion signal 508 (e.g., from the walker) indicating that the flush protocol 408 has completed. For example, the walker receives responses from the core 108 indicating that the cache lines corresponding to the page 136 have been invalidated and/or flushed. After having received responses for each identified cache line, the walker communicates a completion signal 508 to the core 108. In response, the host processor 104 populates the mode bits 150 of the PTE 134 corresponding to the page 136 with an indication of the PIM mode 504 of operation. In addition, the host processor 104 issues a removal instruction 212 to remove the PTE 134 corresponding to the page 136 from the TLB 138 (if the PTE 134 is present in the TLB). This is because once the mode bits 150 of the PTE 134 in the page table 132 are updated, the corresponding PTE 134 in the TLB 138 becomes stale. Furthermore, the page 136 remains marked as uncacheable 410.

During the execution stage 506 of the PIM phase of execution, the host processor 104 receives a write request 208 to the page 136 as part of the workload 146. Here, the write request 208 is forwarded to the memory management unit 110, and the address translation logic 130 translates the virtual memory address of the page 136 to a physical memory address of the page 136. During the translation process, the address translation logic 130 additionally reads the PIM mode 504 from the mode bits 150. Based on the PIM mode 504 being assigned to the page 136, the host processor 104 processes the write request 208 in accordance with the write-through policy 308 and the no-write-allocate policy 412.

Also during the execution stage 506, the host processor 104 receives a PIM-load request 210 as part of the workload 146. Since (1) the page 136 is marked as uncacheable 410, (2) write requests to the page are processed in accordance with the write-through policy 308 and the no-write-allocate policy 412, and (3) the flush protocol 408 has completed, the memory 116 contains the latest version of the data of the page 136. Therefore, the host processor forwards the PIM-Load request 210 (after the address translation process) directly from the memory management unit 110 to the memory controller 114, thereby bypassing the coherence protocol implemented by the cache coherence controller 112. In other words, the host processor 104 avoids performing the number of lookups 220 for the page 136 in the coherence directory 144.

In one or more implementations, the phase of execution 148 is specified as a host phase, hybrid phase, or PIM phase via source code of the software process 120 submitting the workload 146 for execution. Additionally or alternatively, the phase of execution 148 is specified as a host phase, hybrid phase, or PIM phase by a compiler (not shown) of the host processor 104 during a code compiling process. Additionally or alternatively, different phases of execution 148 are specified as host phases, hybrid phases, or PIM phases by different ones of the compiler and/or the source code. By way of example, the compiler, by default, selects whether a phase of execution is a host phase, hybrid phase or PIM phase, but a different phase of execution 148 specified in the source code overrides the compiler's selection.

In various additional or alternative implementations, the host processor 104 includes a separate hardware processor, referred to herein as an arbiter (not shown), which is an electronic circuit that is configured to select modes of operation for the workload 146. In accordance with these implementations, the workload 146 includes barriers which are portions of computer code (e.g., inserted by the compiler and/or included as part of the source code) separating the workload 146 into different phases of execution 148. Here, the barriers indicate that an old phase of execution 148 is ending and a new phase of execution 148 is beginning, but the barriers do not indicate a particular phase of execution 148 (e.g., a host phase, a hybrid phase, or a PIM phase) that is being entered. Rather, the arbiter is configured to select the mode of operation in response to encountering a barrier in the workload 146.

In response to encountering a barrier, for instance, the arbiter is configured to collect and store (e.g., in local memory of the arbiter) performance metrics attained by processing the workload 146 in accordance with a particular mode of operation during the immediately previous phase of execution. In response to encountering a barrier marking the end of a hybrid phase of execution, for instance, the arbiter collects the performance metrics achieved by the system 100 during the hybrid phase of execution and attributes the performance metrics to the hybrid mode 304 of operation. Performance metrics collectable by the arbiter include, but are not limited to, runtime (e.g., how fast the software process 120 executes), energy usage, number of cache misses, memory throughput, and so on. It should be noted that performance metrics collected during the transition phases of execution and PIM phases of execution are attributable to the PIM mode 504 of operation.

In addition, the arbiter is configured to select either the host mode 204 of operation, the hybrid mode 304 of operation, or the PIM mode 504 of operation in response to encountering a barrier marking the beginning of a new phase of execution. It should be noted that a selection to enter the PIM mode 504 of operation triggers assignment of the transition mode 404, followed sequentially by assignment of the PIM mode 504 once the flush protocol 408 completes. In one or more implementations, the arbiter selects the host mode 204, the hybrid mode 304, or the PIM mode 504 for purposes of collecting performance metrics for the selected mode. By way of example, the arbiter selects the mode of operation for performance metric collection purposes (1) if there is insufficient performance metric data to accurately select a mode of operation, (2) if the mode of operation has not been selected in a threshold number of execution phases, and/or (3) every n number of execution phases a random mode of operation is selected.

Additionally or alternatively, the arbiter selects the host mode 204, the hybrid mode 304, or the PIM mode 504 based on the performance metrics. In response to encountering a barrier, for example, the arbiter scores each respective mode of operation based on a combination of two or more performance metrics attained by the respective mode of operation during previous phases of execution. In addition, the arbiter selects, as the mode of operation for the upcoming phase, the mode of operation having the highest score.

Additionally or alternatively, the arbiter selects the mode of operation based on the mode of operation being transitioned from. Consider an example in which the arbiter encounters a barrier marking the end of a particular phase of execution during which a particular mode of operation was assigned. In this example, the arbiter scores each respective mode of operation based solely on the performance metrics attained by the respective mode of operation when transitioning from the particular mode of operation, e.g., and not the performance metrics attained when transitioning from other modes of operation.

Additionally or alternatively, the barrier indicates a particular performance metric to optimize for. Given this, the arbiter selects, as the mode of operation for the upcoming phase, the mode of operation which optimizes the particular performance metric, e.g., the mode of operation that has resulted in the fastest software process 120 execution speed, lowest number of cache misses, or fastest memory throughput.

Additionally or alternatively, the particular performance metric is specified by the operating system 122 (or a kernel thereof). For example, the operating system 122 configures the arbiter with a set of barriers, workloads, and/or software processes 120 associated with respective performance metrics. In this way, when the arbiter encounters particular barriers, workloads, and/or software processes, the arbiter selects the mode of operation that optimizes respective performance metrics associated with the encountered barrier, workload, or software process.

Additionally or alternatively, the operating system 122 configures the arbiter with a set of barriers, workloads, and/or software processes 120 associated with permissible performance metrics. By way of example, the arbiter is configured with a policy that a particular software process 120 is able to optimize for energy usage, but not for runtime. In this way, when the arbiter encounters a barrier, the arbiter selects the mode of operation that optimizes for a performance metric specified by the barrier, unless the barrier is associated with or corresponds to a barrier, workload, or software process 120 that is not permitted to optimize for the specified performance metric. In this case, the arbiter defaults to selecting a mode of operation based on the scores assigned to the various modes of operation, as previously mentioned.

Regardless of whether the mode of operation is specified via the source code, the compiler, the arbiter, or the operating system 122, the software process 120 submitting the workload accesses the page tables 132, TLBs 138, and/or the caches 142 as part of assigning a new mode of operation. Given this, the operating system 122 includes a kernel for interfacing between the software processes 120 (e.g., programs 124, virtual machines 126, and/or containers 128) and system resources, e.g., the page tables 132, TLBs 138, and caches 142. Further, the operating system 122 is configured to expose a kernel-wrapper that is accessible by the programs 124, virtual machines 126, and/or containers 128 to request privileged access to the page tables 132, TLBs 138, and/or the caches 142.

Whenever a new mode is assigned, for instance, a software process 120 requests, via the kernel-wrapper, privileged access to update the page table 132 and the TLB 138. Upon validating the software process 120 as having access to the page table 132 and the TLB 138, the kernel writes the new mode to the mode bits 150 and removes the PTE(s) 134 of one or more pages 136 that are assigned the new mode from the TLB 138. Additionally, when the transition mode 404 is assigned, a software process 120 requests, via the kernel-wrapper, privileged access to update the caches 142. Upon validating the software process 120 as having access to the caches 142, the kernel initiates the flush protocol 408, and further changes the mode bits 150 from the transition mode 404 to the PIM mode 504 once the flush protocol 408 completes. Notably, if a software process 120 does not have access to the system resources, the kernel denies entry of the new mode of operation.

In one or more implementations, the system 100 includes shared pages, i.e., multiple virtual pages of memory 116 map to a single physical page of memory 116. As previously mentioned, each software process 120 running on the core 108 includes a page table 132, and as such, situations arise in which multiple virtual pages map to one physical page of memory 116. Thus, it is possible for one virtual page corresponding to the physical page to be represented in the caches 142, despite a different virtual page corresponding to the physical page operating in the PIM mode 504. Accordingly, it is functionally improper to bypass the coherence protocol for shared pages operating in the PIM mode 504. Therefore, the host processor 104 marks each of the multiple PTEs 134 corresponding to the physical page 136 of the memory 116 as shared, e.g., by populating dedicated bits in the PTEs 134.

Further, in response to receiving an indication of a PIM phase of execution for a page 136 that is marked as shared, the host processor 104 assigns the transition mode 404 to the shared page 136 in accordance with described techniques. However, the host processor 104 maintains the page 136 in the transition mode 404 in response to the flush protocol 408 completing for the shared page, e.g., rather than transitioning to the PIM mode 504. Accordingly, future PIM-Load requests to the shared page 136 are forwarded to the cache coherence controller 112, where the coherence protocol is performed, thereby ensuring coherence of shared virtual pages in the caches 142.

Figure 6:
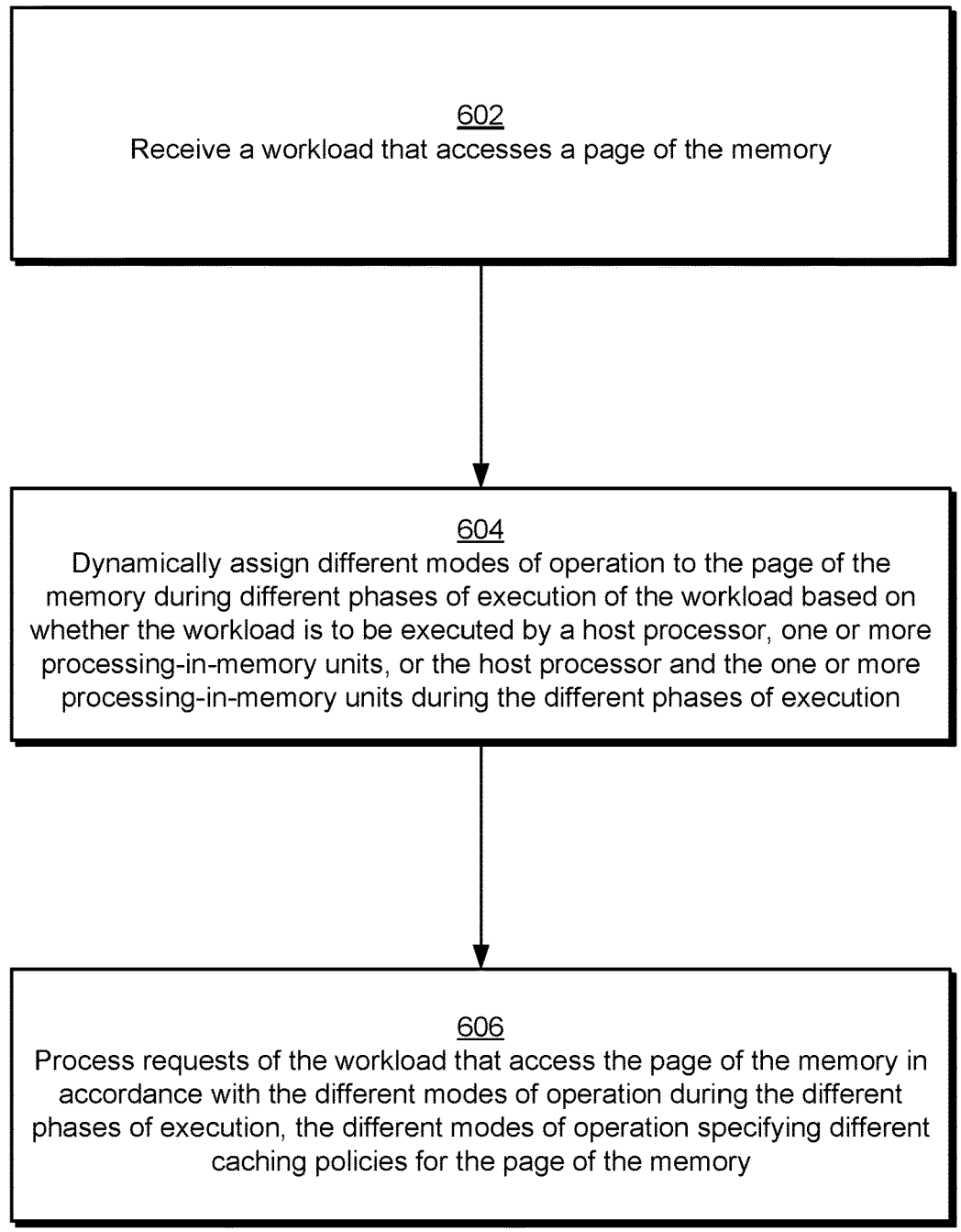
FIG. 6 depicts a procedure in an example implementation of dynamic caching policies for processing-in-memory.

FIG. 6 depicts a procedure 600 in an example implementation of dynamic caching policies for processing-in-memory. In the procedure 600, a workload is received that accesses a page of memory (block 602). For example, the host processor 104 receives, from a software process 120 running on the core 108, a workload 146 that accesses a page 136 of memory 116.

Different modes of operation are dynamically assigned to the page during different phases of execution of the workload based on whether the workload is to be executed by a host processor, one or more processing-in-memory units, or the host processor and the one or more processing-in-memory units during the different phases of execution (block 604). By way of example, the host processor 104 receives, as part of the workload 146, an indication of a particular phase of execution 148 being entered, (e.g., a host phase of execution 148*a*, a hybrid phase of execution 148*b*, or a PIM phase of execution 148*c*), and the host processor 104 assigns a mode of operation to the page 136 corresponding to the particular phase.

During a host phase of execution 148*a* in which the host processor 104 primarily executes the workload 146, the host processor 104 assigns the host mode 204 of operation to the page 136. During a hybrid phase of execution 148*b* in which the host processor 104 and the PIM units 118 execute the workload 146, the host processor 104 assigns the hybrid mode 304 of operation to the page 136. During a PIM phase of execution 148*c* in which the PIM units 118 primarily execute the workload 146, the host processor 104 sequentially assigns the transition mode 404, and then the PIM mode 504 to the page 136.

Requests of the workload that access the page of the memory are processed in accordance with the different modes of operation during the different phases of execution, and the different modes of operation specify different caching policies for the page of the memory (block 606). While the host mode 204 of operation is assigned, write requests 208 to the page 136 are processed in accordance with a write-back policy 216 and a write-allocate policy 218. While the hybrid mode 304 of operation is assigned, write requests 208 to the page 136 are processed in accordance with a write-through policy 308 and a write-allocate policy 218. While the transition mode 404 of operation or the PIM mode 504 of operation are assigned, write requests 208 to the page are processed in accordance with a write-through policy 308 and a no-write-allocate policy 412. When the transition mode 404 is assigned, the host processor 104 implements a flush protocol 408, which flushes and/or invalidates each cache line corresponding to the page 136 from the caches 142. Thus, when the flush protocol 408 completes, the host processor 104 assigns the PIM mode 504 of operation. When the PIM mode 504 of operation is assigned, PIM-Load requests 210 are processed by bypassing the coherence protocol implemented by the cache coherence controller 112.

It should be understood that many variations are possible based on the disclosure herein. Although features and elements are described above in particular combinations, each feature or element is usable alone without the other features and elements or in various combinations with or without other features and elements.

The various functional units illustrated in the figures and/or described herein (including, where appropriate, the device 102, host processor 104, the memory module 106, the core 108, the memory management unit 110, the cache coherence controller 112, the memory controller 114, the address translation logic 130, and the caches 142) are implemented in any of a variety of different manners such as hardware circuitry, software or firmware executing on a programmable processor, or any combination of two or more of hardware, software, and firmware. The methods provided are implemented in any of a variety of devices, such as a general purpose computer, a processor, or a processor core. Suitable processors include, by way of example, a general purpose processor, a special purpose processor, a conventional processor, a digital signal processor (DSP), a graphics processing unit (GPU), a parallel accelerated processor, a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

In one or more implementations, the methods and procedures provided herein are implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A computing device, comprising:
    a memory that includes one or more processing-in-memory units; and
    a host processor that includes one or more caches, the host processor configured to:
        receive a workload that accesses a page of the memory;
        dynamically assign different modes of operation to the page of the memory during different phases of execution of the workload based on whether the workload is to be executed by the host processor, the one or more processing-in-memory units, or the host processor and the one or more processing-in-memory units during the different phases of execution; and
        process requests of the workload that access the page of the memory in accordance with the different modes of operation during the different phases of execution, the different modes of operation specifying different caching policies for the page of the memory.

2. The computing device of claim 1, wherein to dynamically assign the different modes of operation to the page, the host processor is configured to populate a page table entry of the page with mode bits indicating the different modes of operation during the different phases of execution.

3. The computing device of claim 1, wherein the host processor further includes a translation lookaside buffer, and the host processor is configured to remove the page of the memory from the translation lookaside buffer in response to a new mode of operation being assigned to the page of the memory.

4. The computing device of claim 1, wherein the workload includes barriers separating the workload into the different phases of execution, and to dynamically assign the different modes of operation to the page of the memory, the host processor is configured to select, in response to encountering a barrier, one of the different modes of operation based on performance metrics attained by the different modes of operation during previous phases of execution.

5. The computing device of claim 1, wherein to dynamically assign the different modes of operation, the host processor is configured to assign a host mode to the page of the memory during a phase of execution in which the host processor primarily executes the workload.

6. The computing device of claim 5, wherein to process the requests of the workload that access the page in accordance with the host mode during the phase of execution, the host processor is configured to write data of the page to the one or more caches in accordance with a write-back policy and a write-allocate policy.

7. The computing device of claim 1, wherein to dynamically assign the different modes of operation, the host processor is configured to assign a hybrid mode to the page of the memory during a phase of execution in which the host processor and the one or more processing-in-memory units execute the workload.

8. The computing device of claim 7, wherein to process the requests of the workload that access the page in accordance with the hybrid mode during the phase of execution, the host processor is configured to write data of the page to the one or more caches in accordance with a write-through policy and a write-allocate policy.

9. The computing device of claim 1, wherein to dynamically assign the different modes of operation, the host processor is configured to sequentially assign a transition mode followed by a processing-in-memory mode during a phase of execution in which the one or more processing-in-memory units primarily execute the workload.

10. The computing device of claim 9, wherein to process the requests of the workload that access the page in accordance with the transition mode and the processing-in-memory mode during the phase of execution, the host processor is configured to write data of the page to the one or more caches in accordance with a write-through policy and a no-write-allocate policy.

11. The computing device of claim 9, wherein the host processor is configured to implement a flush protocol based on the transition mode being assigned, the flush protocol including at least one of flushing and invalidating each cache line corresponding to the page from the one or more caches, the processing-in-memory mode being assigned based on the flush protocol having completed.

12. The computing device of claim 11, wherein the host processor further includes a cache coherence controller, and to process the requests of the workload that access the page in accordance with the transition mode during the phase of execution, the cache coherence controller is configured to receive a processing-in-memory load request for the page of the memory, and perform one or more lookups for the page in a coherence directory of the cache coherence controller based on the flush protocol being in progress.

13. The computing device of claim 11, wherein the host processor further includes a cache coherence controller, and to process the requests of the workload that access the page in accordance with the processing-in-memory mode during the phase of execution, the host processor is configured to receive a processing-in-memory load request for the page of the memory, and bypass one or more lookups for the page in a coherence directory of the cache coherence controller based on the flush protocol having completed.

14. A system, comprising:
    a memory module having a memory and one or more processing-in-memory units; and
    a host processor communicatively coupled to the memory module and having one or more caches, the host processor configured to perform operations including:
        receiving a workload that accesses a page of the memory;
        dynamically assigning a processing-in-memory mode to the page of the memory during a phase of execution of the workload in which the one or more processing-in-memory units primarily execute the workload; and changing caching policies for the page based on the processing-in-memory mode being assigned, the changed caching policies indicating to process requests of the workload that access the page of the memory in accordance with a write-through policy and a no-write-allocate policy.

15. The system of claim 14, wherein dynamically assigning the processing-in-memory mode includes sequentially assigning a transition mode followed by the processing-in-memory mode during the phase of execution, the operations further including implementing a flush protocol based on the transition mode being assigned, the flush protocol including at least one of flushing and invalidating each cache line corresponding to the page from the one or more caches, the processing-in-memory mode being assigned based on the flush protocol having completed.

16. The system of claim 15, wherein the host processor further includes a cache coherence controller, the operations further including processing a processing-in-memory load request for the page while the transition mode is assigned by sending the processing-in-memory load request to the cache coherence controller, and performing, by the cache coherence controller, one or more lookups for the page in a coherence directory.

17. The system of claim 15, wherein the host processor further includes a cache coherence controller, the operations further including processing a processing-in-memory load request for the page while the processing-in-memory mode is assigned by bypassing one or more lookups for the page in a coherence directory of the cache coherence controller.

18. The system of claim 14, wherein dynamically assigning the processing-in-memory mode includes changing, during execution of the workload, a mode assigned to the page from a different mode to the processing-in-memory mode, and changing the caching policies includes at least one of changing from a write-back policy to the write-through policy and changing from a write-allocate policy to the no-write-allocate policy.

19. A method, comprising:
receiving, by a host processor, a workload that accesses a page of memory;
dynamically assigning, by a host processor, a hybrid mode to the page of the memory during a phase of execution of the workload in which the host processor and one or more processing-in-memory units of the memory execute the workload; and
changing, by the host processor, caching policies for the page based on the hybrid mode being assigned, the changed caching policies indicating to process requests of the workload that access the page in accordance with a write-through policy, and a write-allocate policy.

20. The method of claim 19, wherein dynamically assigning the hybrid mode includes changing, during execution of the workload, a mode assigned to the page from a different mode to the hybrid mode, and changing the caching policies includes at least one of changing from a write-back policy to the write-through policy and changing from a no-write-allocate policy to the write-allocate policy.

* * * * *